US012750123B2

(12) United States Patent
Hancharik et al.

(10) Patent No.: US 12,750,123 B2
(45) Date of Patent: Sep. 29, 2026

(54) SMALL-SIGNAL CENTRIC SCALABLE, MASSIVE SIGNAL PROCESSING GAIN ARCHITECTURE

(71) Applicant: Viasat, Inc., Carlsbad, CA (US)

(72) Inventors: David J. Hancharik, Norcross, GA (US); Parker A. Robinson, Ocala, FL (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 19/099,374

(22) PCT Filed: Jul. 28, 2023

(86) PCT No.: PCT/US2023/029009
§ 371 (c)(1),
(2) Date: Jan. 28, 2025

(87) PCT Pub. No.: WO2024/026108
PCT Pub. Date: Feb. 1, 2024

(65) Prior Publication Data

US 2026/0039369 A1 Feb. 5, 2026

Related U.S. Application Data

(60) Provisional application No. 63/393,698, filed on Jul. 29, 2022.

(51) Int. Cl.
*H04B 1/00* (2006.01)
*H04B 7/08* (2006.01)
(Continued)

(52) U.S. Cl.
CPC ......... *H04B 7/0842* (2013.01); *H04L 1/0054* (2013.01); *H04B 7/02* (2013.01)

(58) Field of Classification Search
CPC .......... H04B 7/0842; H04B 7/02; H04B 1/00; H04B 2001/1054; H04L 1/0054
See application file for complete search history.

(56) References Cited

U.S. PATENT DOCUMENTS 8,139,684 B2 * 3/2012 Lee .................... H04L 27/0012 375/322
11,228,328 B1 1/2022 Veyseh et al.
2019/0393921 A1 * 12/2019 Sengupta ............ H04B 7/0413

FOREIGN PATENT DOCUMENTS

EP 1154589 A2 11/2001
EP 1154589 A3 12/2001
WO 2009114738 A2 9/2009

OTHER PUBLICATIONS

International Search Report and Written Opinion, PCT/US2023/029009, dated Dec. 13, 2023, 9 pages.

* cited by examiner

*Primary Examiner* — Vineeta S Panwalkar
(74) *Attorney, Agent, or Firm* — Holland & Hart LLP

(57) ABSTRACT

Methods, systems, and devices for small-signal centric scalable, massive signal processing gain architecture is described. Antenna elements may receive signal components associated with a first signal transmitted from a terminal in a first frequency range, where the first signal includes a receive message. Low noise amplifiers may amplify a second frequency range of the receive signal components to obtain amplified receive signal components. Analog to digital converters may digitize the amplified receive signal components over the second frequency range to obtain digitized receive signal components. A controller may apply a digital filter to each of the digitized receive signal components to obtain filtered receive signal components; may apply a combining function to the filtered receive signal (Continued)

components to obtain a second signal; and may decode the receive message from the second signal.

15 Claims, 8 Drawing Sheets

(51) Int. Cl.

| | |
|---|---|
| ***H04L 1/00*** | (2006.01) |
| *H04B 7/02* | (2018.01) |

SMALL-SIGNAL CENTRIC SCALABLE, MASSIVE SIGNAL PROCESSING GAIN ARCHITECTURE

CROSS REFERENCE

The present Application is a 371 national phase filing of International Patent Application No. PCT/US2023/029009 by HANCHARIK et al. entitled, "SMALL-SIGNAL CENTRIC SCALABLE, MASSIVE SIGNAL PROCESSING GAIN ARCHITECTURE", filed Jul. 28, 2023, which claims the benefit of U.S. Provisional Patent Application No. 63/393,698 by HANCHARIK et al., entitled "SMALL-SIGNAL CENTRIC SCALABLE, MASSIVE SIGNAL PROCESSING GAIN ARCHITECTURE" filed Jul. 29, 2022, each of which is assigned to the assignee hereof and each of which is hereby incorporated by reference in its entirety.

FIELD OF TECHNOLOGY

The following relates generally to communications, including small-signal centric scalable, massive signal processing gain architecture.

BACKGROUND

In some examples, a terminal may communicate with an antenna system (e.g., a satellite). As a distance between the terminal and the antenna system grows, an amount of pathloss and/or fading that a signal communicated between the terminal and the antenna system experiences may increase. Thus, a signal to noise ratio (SNR) associated with the signal may decrease and a message encoded in the signal may be less likely to be successfully decoded. Techniques that increase the SNR associated with the signal may increase likelihood that the message encoded in the signal is successfully decoded.

SUMMARY

The described techniques relate to improved methods, systems, devices, and apparatuses that support small-signal centric scalable, massive signal processing gain architecture. For example, the described techniques provide for an antenna system to receive signals from a terminal with a higher gain and/or a higher signal to noise ratio (SNR). For instance, antenna elements may receive signal components associated with a first signal transmitted from a terminal in a first frequency range, where the first signal includes a receive message. Low noise amplifiers may amplify a second frequency range of the receive signal components to obtain amplified receive signal components. Analog to digital converters may digitize the amplified receive signal components over the second frequency range to obtain digitized receive signal components. A controller may apply a digital filter to each of the digitized receive signal components to obtain filtered receive signal components; may apply a combining function to the filtered receive signal components to obtain a second signal; and may decode the receive message from the second signal.

DETAILED DESCRIPTION

Figure 1:
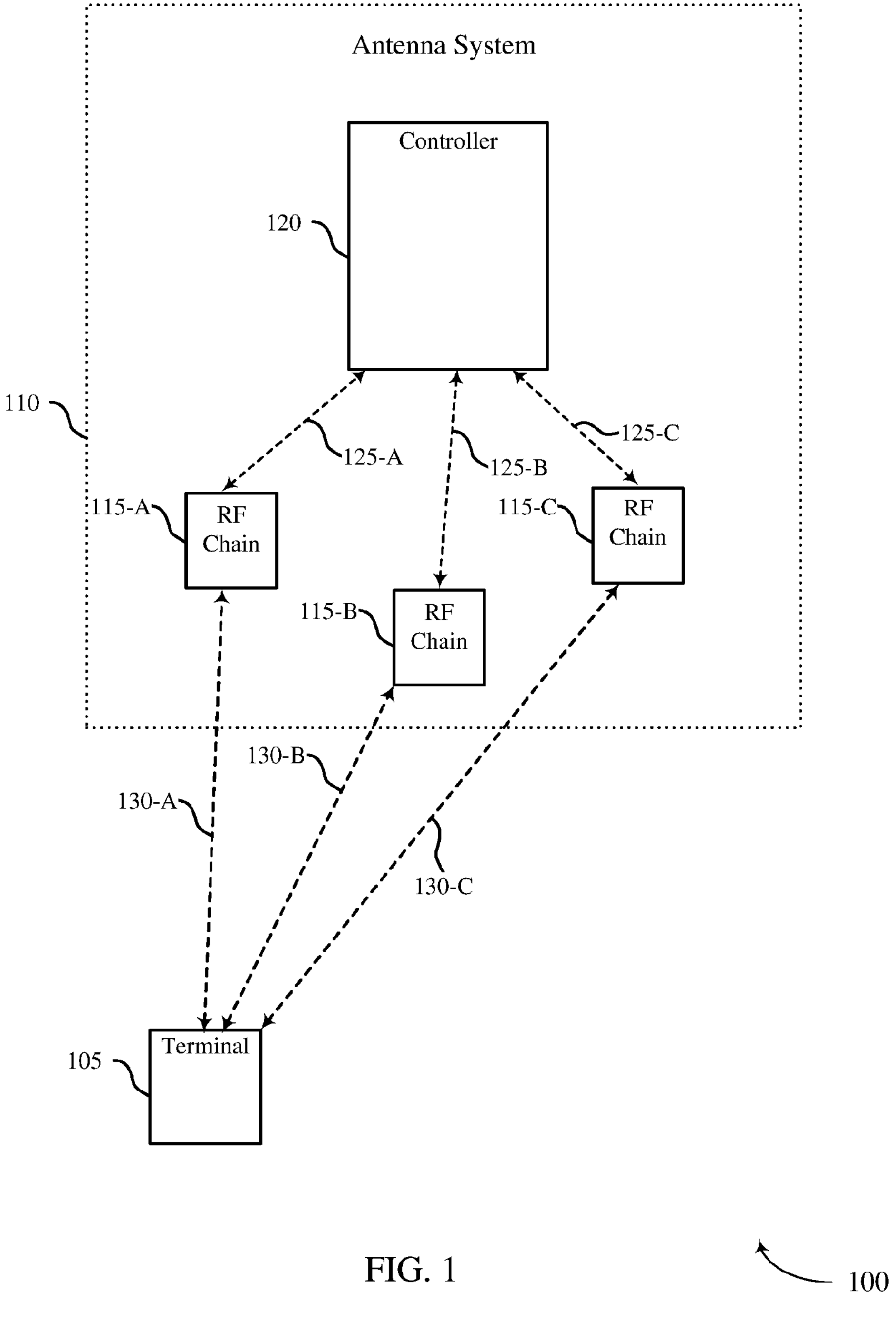
FIG. 1 shows an example of a satellite communication system that supports small-signal centric scalable, massive signal processing gain architecture in accordance with examples described herein.

A terminal may communicate with an antenna system (e.g., an antenna system coupled with a satellite). For instance, the terminal may generate a message and may encode the message in a signal which the terminal transmits towards the antenna system. The antenna system may receive a signal component corresponding to the transmitted signal. In some examples, the signal component may represent a portion of the signal encoding the message that is received by one or more antenna elements of the antenna system. Due to path loss and/or fading on the signal, the signal component received by the antenna system may have a power lower than that of ambient or locally generated noise (e.g., from a thermal noise floor). As the power of the signal component decreases relative to that of the noise, a likelihood of successfully decoding the message may decrease.

The present disclosure describes techniques that may enable the antenna system to account for the ambient or locally generated noise when attempting to decode the message. For instance, the antenna system may include a set of antenna elements, where each antenna element is configured to receive a respective signal component associated with the signal. Each of the antenna elements may be associated with a receive chain. Each receive chain may include components for amplifying, filtering to suppress aliasing, and digitizing an associated signal component before providing the digitized signal component to a controller. The controller may apply a digital filter to each of the multiple digitized signal components before combining the multiple digitized signal components using a combining function (e.g., an averaging function, a weighted function, a beamforming function).

In some examples, the message may be encoded in a first frequency range of the signal. In such examples, each signal component may be amplified over a second frequency range that is larger than the first frequency range. Additionally, a sampling frequency of an analog to digital converter (ADC) used to digitize the multiple signal components may be larger (e.g., by an oversampling factor) than a highest frequency of the second frequency range. Amplifying over the second frequency range and using an increased sampling frequency may increase a width of the frequency response of the digital filter, which may result in an increased signal-to-noise ratio (SNR) for each signal component that has had the digital filter applied. Additionally, or alternatively, applying a combining function to each signal component after the digital filter has been applied may increase the SNR. In some examples, the oversampling factor and/or the quantity of signal components that are combined digitally in the controller (e.g., quantity of receive chains) may be selected to provide SNR gain. For example, the oversampling factor or the quantity of receive chains may, individually, be selected to provide greater than 3 decibels (dB), greater than 6 dB, greater than 12 dB, greater than 20 dB, greater than 30 dB, greater than 40 dB, greater than 50 dB, or greater than 60 dB of SNR gain. Thus, a total SNR gain may be high enough to enable decoding of a signal received at each antenna with very low SNR (e.g., lower than −30 dB, lower than −40 dB, lower than −60 dB, lower than −80 dB, lower than −100 dB). Such SNR gain may provide enhanced uplink interference mitigation for far-field reception geometry.

Aspects of the disclosure are initially described in the context of satellite communication systems. Additional aspects of the disclosure are described in the context of circuit flow diagrams, a signal flow diagram, and an antenna system. Aspects of the disclosure are further illustrated by and described with reference to apparatus diagrams, system diagrams, block diagrams, and flowcharts that relate to small-signal centric scalable, massive signal processing gain architecture.

FIG. 1 shows an example of a satellite communication system 100 that supports small-signal centric scalable, massive signal processing gain architecture in accordance with examples described herein. Satellite communication system 100 may include a terminal 105 and an antenna system 110 (e.g., an antenna system coupled with a satellite in orbit with the Earth). The antenna system 110 may include radio frequency (RF) chains 115-*a,* 115-*b,* and 115-*c* as well as controller 120. Although three RF chains are depicted herein, it is to be understood that the techniques described herein may be applied for a greater or smaller quantity of RF chains.

Terminal 105 may include any of various devices configured to communicate signals with the antenna system 110. Terminal 105 may include a fixed terminal (e.g., a ground-based stationary terminal), or a mobile terminal mounted on a mobile platform (e.g., a boat, an aircraft, a ground-based vehicle, and the like). A terminal 105 may communicate data and information with an access node via the antenna system 110. The data and information may be communicated with a destination device such as a network device, or some other device or distributed server associated with a network.

Terminal 105 may include a terminal antenna assembly which may also include various hardware for mounting a terminal antenna. A terminal antenna assembly may also include circuits and/or processors for converting (e.g., performing frequency conversion, modulating/demodulating, multiplexing/demultiplexing, filtering, forwarding, etc.) between radio frequency (RF) satellite communication signals, and satellite communications signals transmitted between the terminal antenna and a satellite receiver. For mobile terminals, the terminal antenna assembly may be mounted on the outside of the mobile platform (e.g., outside of the fuselage of an aircraft). Additionally, or alternatively, the terminal 105 may include a transceiver, which may be mounted on the inside or outside of the mobile platform and may include circuits and/or processors for performing various RF signal operations (e.g., receiving, performing frequency conversion, modulating/demodulating, multiplexing/demultiplexing, etc.).

In some examples, terminal 105 may communicate a message with antenna system 110. For instance, terminal 105 may generate a message and may provide the message via an uplink signal transmitted from the terminal 105. The uplink signal may be received at each RF chain as a respective signal component. For instance, the uplink signal may be received as a first receive signal component at RF chain 115-*a* over wireless path 130-*a,* may be received as a second receive signal component at RF chain 115-*b* over wireless path 130-*b,* and may be received as a third receive signal component at RF chain 115-*c* over wireless path 130-*c.* Upon receiving the respective receive signal component, the RF chains may modify the respective receive signal component (e.g., via filtering, digitizing, amplifying) and may provide the respective modified receive signal component to controller 120 via a respective path (e.g., a conductive or wired path). For instance, RF chain 115-*a* may provide a first modified receive signal component (e.g., a modified version of the receive signal component) to controller 120 via path 125-*a;* RF chain 115-*b* may provide a second modified receive signal component (e.g., a modified version of the second receive signal component) to controller 120 via path 125-*b;* and RF chain 115-*c* may provide a third modified receive signal component (e.g., a modified version of the third receive signal component) to controller 120 via path 125-*c.* Controller 120 may apply a digital filter to each of the modified receive signal components and may apply a combining function (e.g., averaging, weighted averaging, according to a beamforming matrix) on the filtered receive signal components generated from performing the digital filtering to generate an estimation of the signal transmitted from the terminal 105. The controller 120 may then decode the estimation of the signal to recover the message. Additional details concerning a terminal 105 transmitting a message to an antenna system 110 according to the techniques described herein may be described, for instance, with reference to FIGS. 2 and 3.

Additionally, or alternatively, the controller 120 may generate a message and may encode the message in a downlink signal. The controller 120 may apply a transmit beamforming matrix to the downlink signal to obtain multiple digitized transmit signal components and may provide each digitized transmit signal component to a respective RF chain. For instance, the controller 120 may provide a first digitized transmit signal component to RF chain 115-*a* via path 125-*a,* a second digitized transmit signal component to RF chain 115-*b* via path 125-*b,* and a third digitized transmit signal component to RF chain 115-*c* via path 125-*c.* Upon receiving the respective digitized transmit signal component, the RF chains may modify the respective digitized transmit signal component (e.g., converting to analog, amplifying, filtering) and may provide the modified transmit signal component to terminal 105 via a respective wireless link. For instance, RF chain 115-*a* may provide a first modified transmit signal component (e.g., a modified version of the first digitized transmit signal component) to terminal 105 via wireless path 130-*a;* RF chain 115-*b* may provide a second modified transmit signal component (e.g., a modified version of the second digitized transmit signal component) to terminal 105 via wireless path 130-*b;* and may provide a third modified transmit signal component (e.g., a modified version of the third digitized transmit signal component) to terminal 105 via wireless path 130-*c*. Upon receiving the modified transmit signal components, terminal 105 may construct an estimation of the downlink signal and may recover the message from the estimation of the downlink signal. Additional details concerning an antenna system 110 transmitting a message to a terminal 105 according to the techniques described herein may be described, for instance, with reference to FIG. 4.

In some examples, the paths and wireless links used for transmitting messages from terminal 105 to controller 120 may be different than the paths and wireless links used for transmitting messages from controller 120 to terminal 105. Additionally, or alternatively, different RF chains may be used in receiving messages from terminal 105 as compared to transmitting messages to terminal 105.

In some examples, antenna elements of the RF chains 115-*a,* 115-*b,* and 115-*c* (e.g., receive RF chains, such as RF chain 213 of FIG. 2 or transmit RF chains, such as RF chain 402-*a,* 402-*b,* and 402-*c* of FIG. 4) may be arranged in a grid (e.g., a regular grid or a randomized grid) that extends in a first direction and a second direction perpendicular to the first direction. Additional details may be described herein, for instance, with reference to FIG. 5.

In some examples, the receive RF chains and transmit RF chains may share (e.g., be connected to, coupled with) a same antenna element. In such examples, antenna element 225-*a* of FIG. 2 and antenna element 405-*a* of FIG. 4 may represent a same antenna element; antenna element 225-*b* of FIG. 2 and antenna element 405-*b* of FIG. 4 may represent a same antenna element; and antenna element 225-*c* of FIG. 2 and antenna element 405-*c* of FIG. 4 may represent a same antenna element. In order to preserve a signal's polarization and angle of arrival, a signal's electrical field components in three physical orthogonal axes (e.g., X, Y, and Z) may also be preserved. In such examples, receive RF chains and transmit RF chains may be respectively arranged as a collection of subgroups (e.g., subgroups of receive RF chains or subgroups of transmit RF chains), where the members of each subgroup are used to receive or transmit the E-Field components in three dimensions (e.g., X, Y, and Z). Each receive RF chain subgroup may have an identical count of receive RF chains (e.g., 3 receive RF chains per subgroup) and each transmit RF chain subgroup may have an identical count of RF chains (e.g., 3 transmit RF chains per subgroup). The antenna elements in the receive RF chains or transmit RF chains in each subgroup may be physically grouped and arranged in orthogonal X, Y, and Z axes (e.g., as depicted by tripole 512 and half-tripole 513 of FIG. 5) to preserve polarization and angle of arrival information.

Figure 2:
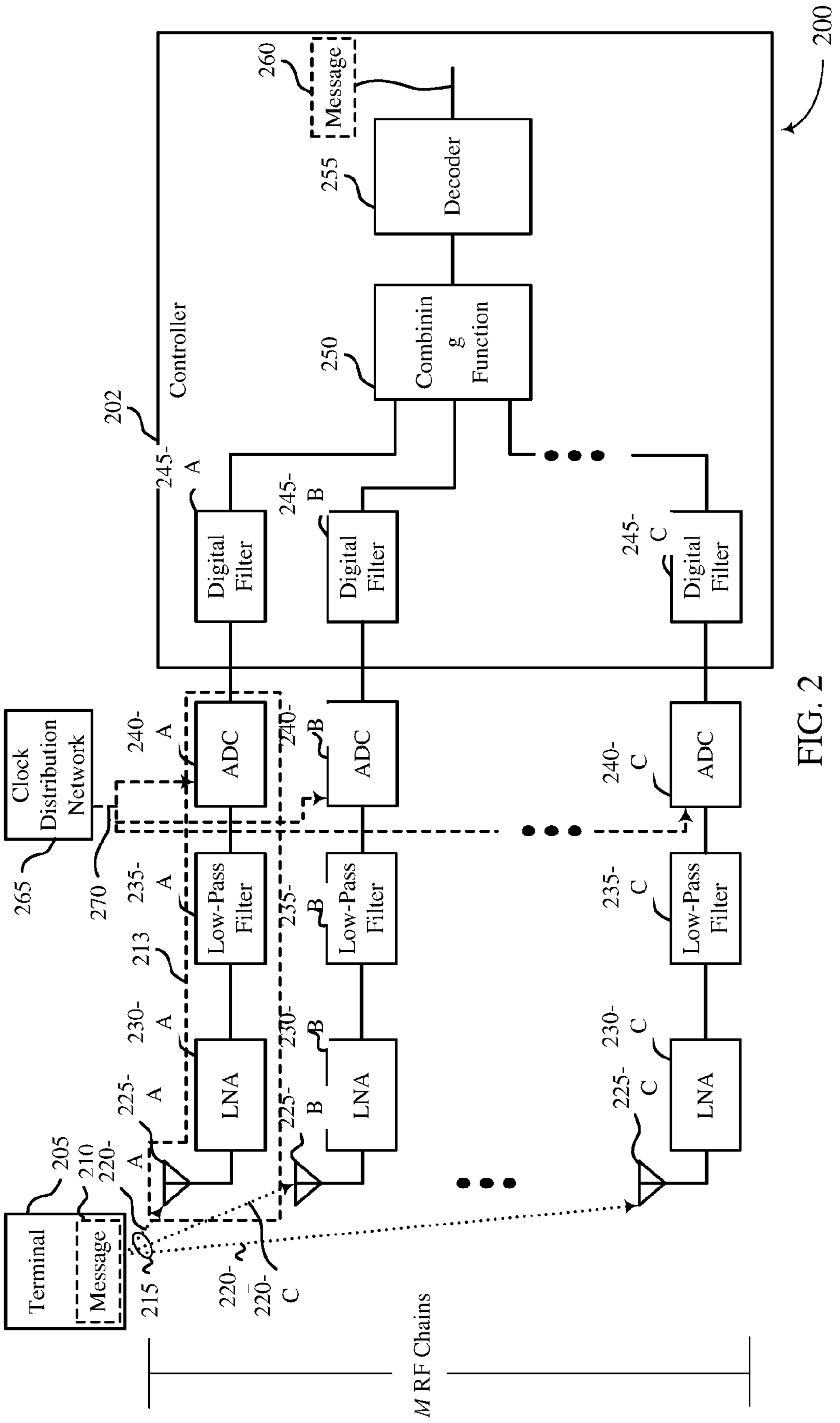
FIG. 2 shows an example of a circuit flow diagram that supports small-signal centric scalable, massive signal processing gain architecture in accordance with examples described herein.
Figure 4:
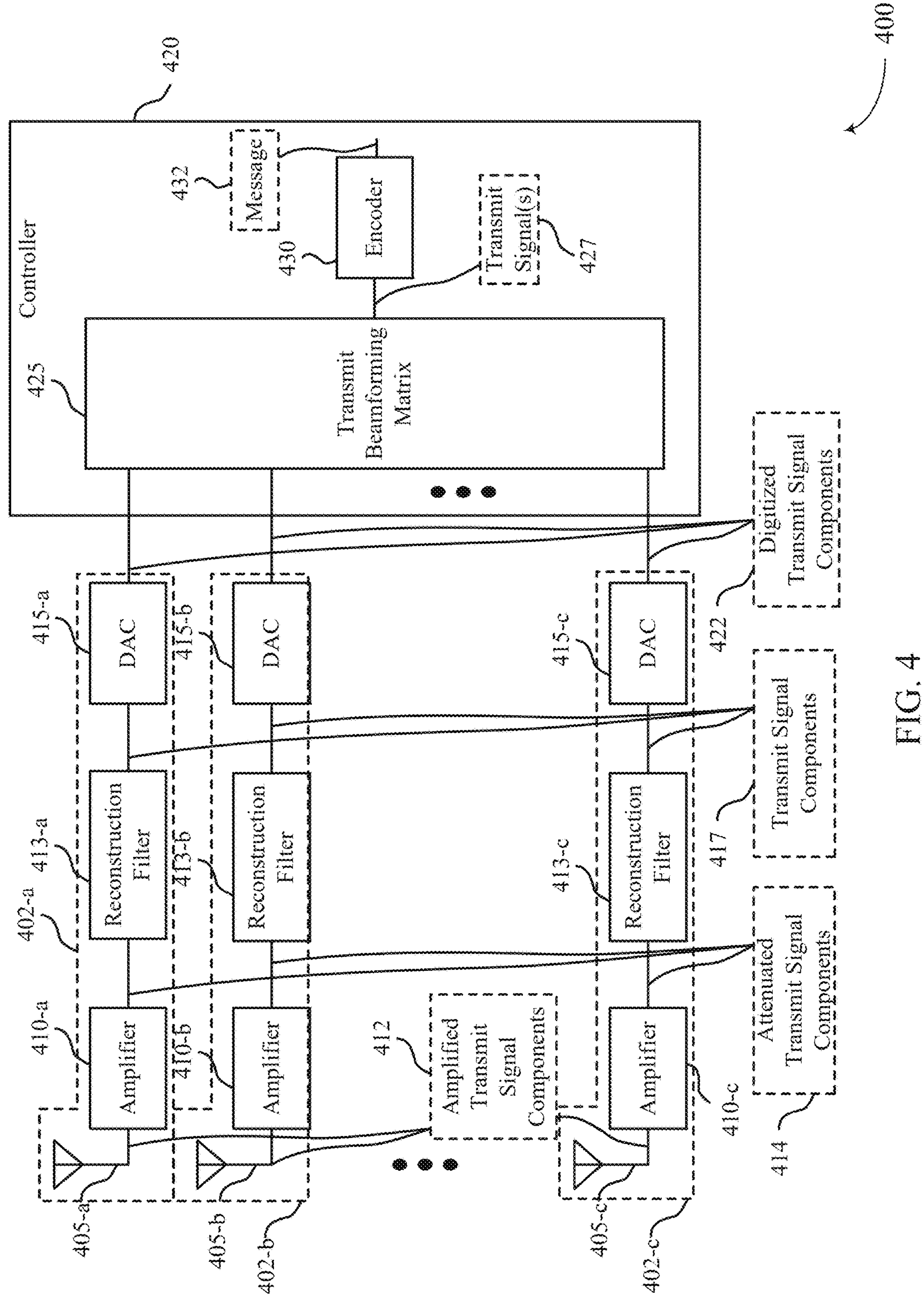
FIG. 4 shows an example of a circuit flow diagram that supports small-signal centric scalable, massive signal processing gain architecture in accordance with aspects of the present disclosure.

In some examples, the coordinate system orientation of the subgroups relative to other subgroups may be uncontrolled and calibrated to facilitate follow-on processing by a controller (e.g., controller 120 of FIG. 1, controller 202 of FIG. 2, controller 420 of FIG. 4). In some examples, where signal polarization and angle of arrival are preserved, multiple signals arriving at an antenna element may be received and kept separate using spatial multiplexing (e.g., angle of arrival multiplexing) and polarization multiplexing. Additionally, or alternatively, multiple signals departing from (e.g., being transmitted from) an antenna element may be transmitted using assigned spatial multiplexing (e.g., angle of departure multiplexing) and polarization multiplexing for signal separation among receiving terminals 105. In some examples, receive RF chains (e.g., or a controller coupled with the RF chains, such as controller 120 of FIG. 1 or controller 202 of FIG. 2) may be configured to demultiplex and decode signals from wireless devices (e.g., terminals 105) based on their polarization and/or an angle of arrival associated with a signal received at a receive RF chain. Additionally, or alternatively, transmit RF chains (e.g., or a controller coupled with the transmit RF chains, such as controller 120 of FIG. 1 or controller 420 of FIG. 4) may be configured to multiplex and encode signals to transmit to wireless devices (e.g., terminals 105) based on an assigned polarization and/or an angle of departure associated with a signal to be transmitted by a transmit RF chain. Additional details may be described herein, for instance, with reference to FIG. 6.

In some examples, the techniques described herein may have one or more advantages. For instance, a signal including a message may be received at an RF chain (e.g., RF chain 115-*a*) below a noise floor. In order to raise the signal above the noise floor, the controller 120 may oversample a receive signal component associated with the signal and may apply a digital filter (e.g., a matched filter) to the oversampled receive signal component. Additionally, or alternatively, the controller 120 may employ multiple RF chains (e.g., RF chains 115-*a,* 115-*b,* and 115-*c*) and may use a combining function on the receive signal components from each of these RF chains. As the sampling frequency increases and/or the quantity of RF chains increases, the signal may have an increased likelihood of being raised above the noise floor. If the signal is raised above the noise floor, a likelihood of success in decoding the message in the signal may also increase.

FIG. 2 shows an example of a circuit flow diagram 200 that supports small-signal centric scalable, massive signal processing gain architecture in accordance with aspects of the present disclosure. In some examples, circuit flow diagram 200 may implement one or more aspects of satellite communication system 100. For instance, terminal 205 may be an example of a terminal 105 as described with reference to FIG. 1; controller 202 may be an example of a controller 120 as described with reference to FIG. 1; antenna element 225-*a,* low-noise amplifier (LNA) 230-*a,* low-pass filter 235-*a,* and analog to digital converter (ADC) 240-*a* may be examples of one or more components included in RF chain 115-*a;* antenna element 225-*b,* LNA 230-*b,* low-pass filter 235-*b,* and ADC 240-*b* may be examples of one or more components included in RF chain 115-*b* (not shown in FIG. 2 for the sake of clarity); and antenna element 225-*c,* LNA 230-*c,* low-pass filter 235-*c,* and ADC 240-*c* may be examples of one or more components included in RF chain 115-*c* (not shown in FIG. 2 for the sake of clarity). Additionally, or alternatively, antenna elements 225-*a,* 225-*b,* and 225-*c;* LNAs 230-*a,* 230-*b,* and 230-*c;* low-pass filters 235-*a,* 235-*b,* and 235-*c;* ADCs 240-*a,* 240-*b,* and 240-*c,* clock distribution network 265, and controller 202 may be examples of one or more components included in antenna system 110. Controller 202 may include digital filters 245-*a,* 245-*b,* and 245-*c,* a combining function 250, and a decoder 255. Although three pathways (e.g., three RF chains 115) including antenna elements 225-*a,* 225-*b,* and 225-*c* are depicted, it is to be understood that the techniques described herein may be generalized to M pathways, where M≥2 and where M represents a number of receivers or transmitters used to receive or transmit a given signal by the array. In some examples (e.g., to preserve signal polarization and signal angle of arrival), there may be 3*M pathways, where the number 3 corresponds to three orthogonal axes X, Y, and Z used to preserve signal polarization and angle of arrival.

LNA 230-*a* may be coupled with antenna element 225-*a* and low-pass filter 235-*a*; LNA 230-*b* may be coupled with antenna element 225-*b* and low-pass filter 235-*b*; and LNA 230-*c* may be coupled with antenna element 225-*c* and low-pass filter 235-*c*. Additionally, ADC 240-*a* may be coupled with low-pass filter 235-*a*, clock distribution network 265, and digital filter 245-*a*; ADC 240-*b* may be coupled with low-pass filter 235-*b*, clock distribution network 265, and digital filter 245-*b*; and ADC 240-*c* may be coupled with low-pass filter 235-*c*, clock distribution network 265, and digital filter 245-*c*. Combining function 250 may be coupled with digital filters 245-*a*, 245-*b*, and 245-*c* and decoder 255. Each antenna element of antenna elements 225-*a*, 225-*b*, and 225-*c* may include a polarization sensitivity and a capability to electronically control an angle of arrival (AoA). In some such examples, a group of at least 3 antenna elements such as antenna elements 225-*a*, 225-*b*, and 225-*c* may act as a group to preserve signal polarization and signal AoA. In some examples, each antenna element of antenna elements 225-*a*, 225-*b*, and 225-*c* may be included in or an example of a tripole or a half-tripole. In such examples, each of antenna elements 225-*a*, 225-*b*, and 225-*c* may correspond to a respective pole of a tripole or a half-tripole. For instance, antenna element 225-*a* may represent a first dipole of a tripole or half-tripole extending in a first direction (e.g., an X direction), antenna element 225-*b* may represent a second dipole of the tripole or half-tripole extending in a second direction (e.g., a Y direction); and antenna element 225-*c* may represent a third dipole of the tripole or a unipole of the half-tripole extending in a third direction (e.g., a Z direction). Additional details may be described herein, for instance, with reference to FIG. 5.

In some examples, terminal 205 may generate a message 210 and may encode the message 210 in an uplink signal 215. Terminal 205 may transmit the uplink signal 215 in a first frequency range towards antenna elements 225-*a*, 225-*b*, and 225-*c*. In some examples, the signal may experience varying amounts of path loss and/or fading between terminal 205 and antenna elements 225-*a*, 225-*b*, and 225-*c*. As such antenna element 225-*a* may receive the uplink signal 215 as receive signal component 220-*a*; antenna element 225-*b* may receive the uplink signal 215 as receive signal component 220-*b*; and antenna element 225-*c* may receive the uplink signal 215 as receive signal component 220-*c*. Additionally, noise may be introduced into signal components 220-*a*, 220-*b*, and 220-*c* from the transmission medium and/or from an antenna response of antenna elements 225-*a*, 225-*b*, and 225-*c*. The noise from the antenna response may be uncorrelated across each of antenna elements 225-*a*, 225-*b*, and 225-*c*. Antenna element 225-*a* may provide receive signal component 220-*a* to LNA 230-*a*; antenna element 225-*b* may provide receive signal component 220-*b* to LNA 230-*b*; and antenna element 225-*c* may provide receive signal component 220-*c* to LNA 230-*c*. The first frequency range may include a same range of frequencies as that spanned by a representation of the message in each receive signal component received by each of antenna elements 225-*a*, 225-*b*, and 225-*c*.

LNAs 230-*a*, 230-*b*, and 230-*c* may be configured to amplify a second frequency range of receive signal components 220-*a*, 220-*b*, and 220-*c*, respectively, to obtain respective amplified receive signal components. For instance, LNA 230-*a* may amplify the second frequency range of receive signal component 220-*a* to obtain a first amplified receive signal component; LNA 230-*b* may amplify the second frequency range of receive signal component 220-*b* to obtain a second amplified receive signal component; and LNA 230-*c* may amplify the second frequency range of receive signal component 220-*c* to obtain a third amplified receive signal component. In some examples, each of LNAs 230-*a*, 230-*b*, and 230-*c* may introduce additional noise into the amplified signal components which may be uncorrelated across antenna elements 225-*a*, 225-*b*, and 225-*c*. In some examples, the second frequency range may include the first frequency range and may have a bandwidth that is at least two times greater than a bandwidth of the first frequency range. LNAs 230-*a*, 230-*b*, and 230-*c* may provide the first, second, and third amplified receive signal components to low-pass filters 235-*a*, 235-*b*, and 235-*c*, respectively. Each amplified receive signal component may include a signal portion and a noise portion, where a power of the signal portion is lower than a power of the noise portion. In some examples, a bandwidth of the second frequency range is at least sixteen times greater than the bandwidth of the first frequency range. In some examples, automatic gain control (AGC) (e.g., analog AGC) may not be performed for reception of the uplink signal 215. That is, each RF chain may exclude circuits for AGC, and may pass the respective receive signal component without performing analog closed-loop gain control. However, if clipping of signal components 220-*a*, 220-*b*, or 220-*c* is detected at ADC 240-*a*, 240-*b*, or 240-*c* (e.g., by controller 202, another controller, by ADCs 240-*a*, 240-*b*, or 240-*c*), LNAs 230-*a*, 230-*b*, or 230-*c* may be signaled to decrease a gain by which LNAs 230-*a*, 230-*b*, or 230-*c* amplify the respective signal components 220-*a*, 220-*b*, or 220-*c*.

Low-pass filters 235-*a*, 235-*b*, and 235-*c* may be configured to suppress a portion of each of the first, second, and third amplified receive signal components above an upper bound of the second frequency range. For instance, low-pass filter 235-*a* may suppress the portion of the first amplified receive signal component above the upper bound of the second frequency range before providing the first amplified receive signal component to ADC 240-*a*; low-pass filter 235-*b* may suppress (e.g., attenuate) the portion of the second amplified receive signal component above the upper bound of the second frequency range before providing the second amplified signal component to ADC 240-*b*; and low-pass filter 235-*c* may suppress (e.g., attenuate) the portion of the third amplified signal component above the upper bound of the third frequency range before providing the third amplified signal component to ADC 240-*c*. Each of low-pass filters 235-*a*, 235-*b*, and 235-*c* may be an anti-aliasing filter. In some examples, low-pass filters 235-*a*, 235-*b*, and 235-*c* may introduce additional noise (e.g., dither) into the receive signal components which may be uncorrelated across antenna elements 225-*a*, 225-*b*, and 225-*c*. In some examples, the cut-off frequency for attenuation may be set to a sampling rate of ADCs 240-*a*, 240-*b*, and 240-*c*. For instance, if the sampling rate is 4000 mega-samples per second (MSPS), the cut-off frequency may be set to 2000 MHz.

ADCs 240-*a*, 240-*b*, and 240-*c* may be configured to digitize the first, second, and third amplified receive signal components over the second frequency range to obtain first, second, and third digitized receive signal components, respectively. For instance, ADC 240-*a* may be configured to digitize the first amplified receive signal component over the second frequency range to obtain the first digitized receive signal component; ADC 240-*b* may be configured to digitize the second amplified receive signal component over the second frequency range to obtain the second digitized receive signal component; and ADC 240-*c* may be configured to digitize the third amplified receive signal component over the second frequency range to obtain the third receive signal component. In some examples, a sampling frequency of each of ADCs 240-*a*, 240-*b*, and 240-*c* may be at least four times higher than a highest frequency of the second frequency range. In some examples, the sampling frequency is at least sixteen times higher than the highest frequency of the second frequency range. When the sampling frequency is above twice a highest frequency of the first frequency range or the second frequency range, oversampling may occur at ADCs 240-*a*, 240-*b*, and 240-*c*.

Controller 202 may obtain the first, second, and third digitized receive signal components from ADCs 240-*a*, 240-*b*, and 240-*c* and may provide the first, second, and third digitized receive signal components to digital filters 245-*a*, 245-*b*, and 245-*c*, respectively. ADCs 240-*a*, 240-*b*, and 240-*c* may be coupled with a clock distribution network 265 configured to distribute a common clock signal 270 to ADCs 240-*a*, 240-*b*, and 240-*c* for digitizing the set of amplified receive signal components. In some examples, the common clock signal 270 may be used by ADCs 240-*a*, 240-*b*, and 240-*c* to ensure synchronous digitization (e.g., propagation delays may be calibrated). In some examples, the set of receive signal components may be directly sampled (e.g., by ADCs 240-*a*, 240-*b*, and 240-*c*) with no analog down-conversion performed on the set of receive signal components between being received at the set of antenna elements and being digitized at the set of ADCs. In other examples, analog down-conversion may be performed on the set of receive signal components, in which case a downconverter may be present in RF chains 115 (e.g., prior to low-pass filters 235).

Controller 202 may be configured to apply digital filters 245-*a*, 245-*b*, and 245-*c* to the first, second, and third digitized receive signal components, respectively, to obtain a set of filtered receive signal components. For instance, digital filter 245-*a* may be applied to the first digitized receive signal component to obtain a first filtered receive signal component; digital filter 245-*b* may be applied to the second digitized receive signal component to obtain a second filtered receive signal component; and digital filter 245-*c* may be applied to the third digitized receive signal component to obtain a third filtered receive signal component. In some examples, each of digital filters 245-*a*, 245-*b*, and 245-*c* may have a frequency response corresponding to candidate messages. For instance, digital filters 245-*a*, 245-*b*, and 245-*c* may reject frequency components that are not associated with a symbol of uplink signal 215. In some examples, an impulse response of digital filters 245-*a*, 245-*b*, and 245-*c* may be equivalent to a reversed and time-shifted version of a pulse or symbol of uplink signal 215 (e.g., where each pulse or symbol may correspond to a value of one or more bits). In some examples, digital filters 245-*a*, 245-*b*, and 245-*c* may each be least mean squares (LMS) filters. Digital filters 245-*a*, 245-*b*, and 245-*c* may provide the first, second, and third filtered receive signal components to combining function 250.

In some examples, when antenna elements (e.g., antenna elements 225-*a*, 225-*b*, and 225-*c*) are used in groups to preserve signal polarization and signal AoA, the total number of pathways may be equals to 3 * M. In such examples, combining function 250 may interpret first, second, and third filtered receive signal components as subcomponents X, Y, and Z (e.g., a group of 3) to preserve polarization and angle of arrival. Combining function 250 may process these three subcomponents in one or more steps. For instance, combining function 250 may process each subgroup of 3 pathways as X, Y, and Z subcomponents into a single signal component with polarization and angle of arrival preserved, which may reduce the total number of inputs to combining function 250 from 3*M to just M. Additionally, combining function 250 may combine the remaining M signal components into a single signal for processing by decoder 255. Alternatively, combining function 250 may translate (e.g., using calibrated measures of antenna orientations) data from the 3*M input pathways into a single coordinate system and may combine the M X subcomponent pathways into one master subcomponent defined as $X_m$, may combine the M Y subcomponent pathways into one master subcomponent defined as $Y_m$, and may combine the M Z subcomponent pathways into one master subcomponent defined as $Z_m$. Combining function 250 may process these 3 master subcomponents $X_m$, $Y_m$, and $Z_m$ into a signal with polarization and angle of arrival preserved. Decoder 255 may then process this signal.

Controller 202 may be configured to apply the combining function 250 to the first, second, and third filtered receive signal components to obtain a second signal. Controller 202 may provide the second signal to decoder 255. The combining function 250 may be an averaging function (e.g., spatial averaging that is non-weighted or weighted to provide spatial beamforming). In some examples, due to the additional noise (e.g., from an antenna response of antenna elements 225-*a*, 225-*b*, and 225-*c*, a frequency response of LNAs 230-*a*, 230-*b*, and 230-*c*, a frequency response of low-pass filters 235-*a*, 235-*b*, and 235-*c*) may be filtered out by combining function 250 due to this noise being uncorrelated across antenna elements 225-*a*, 225-*b*, and 225-*c*.

Controller 202 may be configured to apply the decoder 255 to the second signal to decode the receive message (e.g., as message 260) from the second signal. In some examples, decoding the receive message may be based on the digital filter having the frequency response corresponding to candidate messages. In some examples, decoding the receive message may be based on the polarization and the angle of arrival of a combined data stream as described herein.

In some examples, the techniques described herein may enable a signal 215 received with a low SNR (e.g., below −100 dB) at one or more of antenna elements 225-*a*, 225-*b*, and 225-*c* to be decoded successfully. For instance, in certain scenarios, a receive signal component 220-*a* received at antenna element 225-*a* may include a signal portion and a noise portion, where the signal portion may be below a noise floor associated with the noise portion. Additionally, LNA 230-*a* may not amplify the receive signal component 220-*a* to be above a quantization floor of ADC 240-*a* and no preselect filters (e.g., bandpass filters) may be present between antenna element 225-*a* and ADC 240-*a*. A number of independent pathways (e.g., such as depicted in FIG. 2) may be defined as an oversampling factor (OSF). In a case of an array of ungrouped antenna elements, each pathway is independent and the OSF may be equal to the number of antenna elements. For M antenna elements, the OSF may be equal to M. However, in cases of an array of subgroups of antenna elements where the polarization and the angle of arrival are preserved, the pathways may be dependent within each subgroup and independent between subgroups and the OSF may be equal to the number of subgroups. For a tripole or half-tripole, the antenna elements may be subgrouped in sets of 3. For 3*M antenna elements where the antenna elements are subgrouped in sets of 3, the OSF may be equal to M. In the present example (e.g., assuming M=3) if the pathways associated with antenna elements 225-*a*, 225-*b*, and 225-*c* are independent of each other, then the OSF may be equal to 3. However, if the three pathways correspond to different poles of a sample tripole or a same half-tripole, the OSF may be equal to 1.

The oversampling ratio (OSR) may be defined, in some examples, as a sampling frequency divided by a Nyquist sampling frequency. For instance, the OSR may be defined as a ratio of the sampling frequency to the Nyquist Sampling Frequency, which may be twice a highest frequency of a portion of the signal 215 associated with the sampled bandwidth. Increasing an OSF and an OSR may result in an increased SNR for the signal that arrives at decoder 255. For instance, a gain provided by each of ADCs 240 due to the OSR may be equal to 10 log (OSR) and a gain provided by combining function 250 due to the OSF may be equal to 10 log (OSF).

In some examples, a gain of LNAs 230-*a*, 230-*b*, and 230-*c* may be adjusted based on a gain associated with the OSR and OSF. For instance, if the processing gain provided by each of digital filters 245-*a*, 245-*b*, and 245-*c* due to the OSR is equal to X dB, the processing gain provided by combining function 250 due to the OSF is equal to Y dB, the ADCs 240-*a*, 240-*b*, and 240-*c* at the Nyquist Sampling Frequency observes signals greater than or equal to W dBm and their full scale power is set to 0 dBM, and a signal is received at Z dBm (e.g., where Z may typically be negative), then the LNAs 230-*a*, 230-*b*, and 230-*c* may each have a processing gain of at least P dB, where $P=-(Z+X+Y+W)$. In some examples, the signal power level may be equal to or greater than the sum of ADC detectable signal power and each processing gain (e.g., $(-Z\geq X+Y+W)$ and LNAs 230-*a*, 230-*b*, and 230-*c* may each have a gain greater than P, set to at least a Noise Figure of the ADCs in order to preserve a low RF chain Noise Figure.

In one example, signal 215 may be transmitted from terminal 205 at 0 dBm and may be received by antenna element 225-*a* at −131 dBm (e.g., due to pathloss and/or fading) as receive signal component 220-*a*. When being received at antenna element 225-*a*, receive signal component 220-*a* may experience local noise (e.g., thermal noise in a range of −81 dB to −111 dB) and/or noise from an antenna response of antenna element 225-*a* (e.g., −101 dB). In this example, the SNR may be dominated by the highest noise power of −81 dB, and the starting SNR in dB, SNR, in dB, may equal −131 dBm−(−81)dBm=−50 dB.

When being provided to digital filter 245-*a*, the signal portion of the resulting signal may experience 10 log(2000) =33 dB of gain relative to the noise portion, where OSR=2000. Additionally, when being provided to combining function 250, the signal portion of the resulting signal may experience 10 log(10000)=40 dB of processing gain relative to the noise portion, where OSF=10000 (e.g., where there are 10,000 independent pathways). The starting SNR before processing, $SNR_0$, may be improved by the sum (in dB) of each processing gain. For instance, $SNR_{improved}$ in dB may equal $SNR_0$ dB+10 $\log_{10}$[OSR]+10 $\log_{10}$[OSF]. The noise portion losing 73 dB may raise the signal portion above the noise portion. In this example, the starting SNR of −50 dB may be improved by applying the OSR and OSF to the noise portion to reduce the noise by 73 dB and hence may equal −50 dB+73 dB=23 dB. Thus, decoder 255 may be capable of decoding the signal portion of the resulting signal to recover the receive message.

Figure 3:
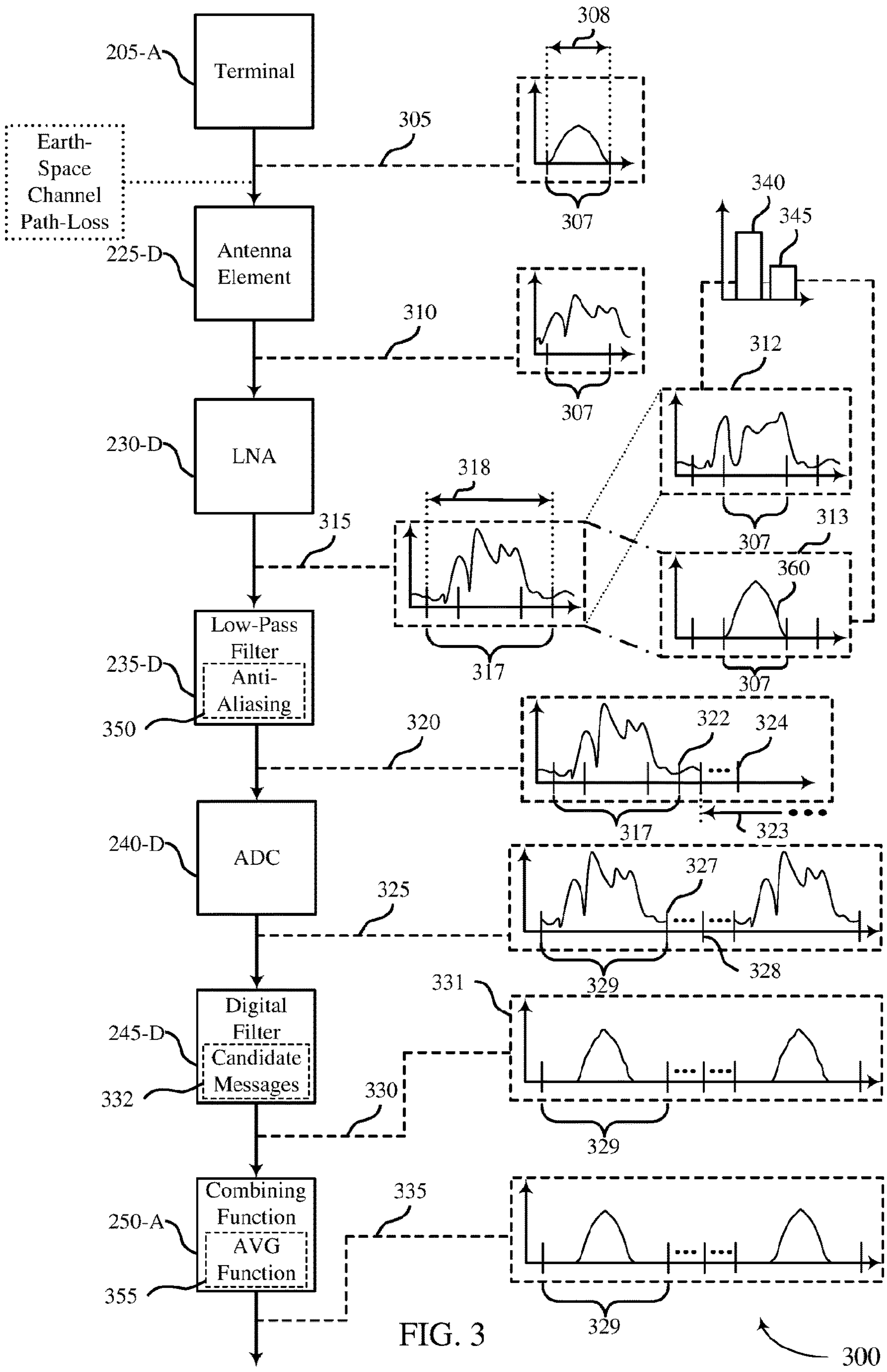
FIG. 3 shows an example of a signal flow diagram that supports small-signal centric scalable, massive signal processing gain architecture in accordance with aspects of the present disclosure.

FIG. 3 shows an example of a signal flow diagram 300 that supports small-signal centric scalable, massive signal processing gain architecture in accordance with aspects of the present disclosure. Signal flow diagram 300 may be an example of operations performed by components of circuit flow diagram 200. For instance, terminal 205-*a* may be an example of a terminal 205; antenna element 225-*d* may be an example of any of antenna elements 225-*a*, 225-*b*, and 225-*c*; LNA 230-*d* may be an example of any of LNA 230-*a*, 230-*b*, and 230-*c*; low-pass filter 235-*d* may be an example of any of low-pass filters 235-*a*, 235-*b*, and 235-*c*; ADC 240-*d* may be an example of any ADCs 240-*a*, 240-*b*, and 240-*c*; digital filter 245-*d* may be an example of any of digital filters 245-*a*, 245-*b*, and 245-*c*; and combining function 250-*a* may be an example of a combining function 250. Additionally, signal 305 may be an example of signal 215 and receive signal component 310 may be an example of any of signal components 220-*a*, 220-*b*, and 220-*c*.

Terminal 205-*a* may generate a message and may encode the message in a first signal 305. The terminal 205-*a* may transmit the first signal 305 in a first frequency range 307 towards antenna element 225-*d*. Antenna element 225-*d* may receive a receive signal component 310 corresponding to the first signal 305 and may provide the signal component to LNA 230-*d*. The first frequency range 307 may include a same range of frequencies as that spanned by a representation 360 of the message (e.g., encoded in first signal 305) in the receive signal component 310 received by the antenna element 225-*d*. In some examples, antenna element 225-*d* may be an example of a space antenna element. In some examples, receive signal component 310 may be a signal resulting from the first signal 305 undergoing earth-space channel path loss in between terminal 205-*a* and antenna element 225-*d*.

LNA 230-*d* may amplify a second frequency range 317 of signal component 310 to obtain an amplified receive signal component 315. Amplified receive signal component 315 may include a noise portion 312 and a signal portion 313. A power 340 of the noise portion 312 may be higher than a power 345 of the signal portion 313. In some examples, the noise portion 312 of the amplified receive signal component 315 may include thermal noise associated with the receive signal component 310 generated prior to its reception at LNA 230-*d* and noise introduced by LNA 230-*d*. In some examples, signal portion 313 may represent an amplified version of the portion of the receive signal component 315 corresponding to the signal 305. In some examples, the second frequency range 317 may include first frequency range 307 and a bandwidth 318 of second frequency range 317 may be greater than a bandwidth 308 of first frequency range 307 (e.g., twice as large, four times as large, eight times as large, sixteen times as large, 32 times as large). LNA 230-*d* may provide the amplified receive signal component 315 to low-pass filter 235-*d*.

Low-pass filter 235-*d* may suppress a portion of the amplified receive signal component 315 (e.g., a portion 323 above a cut-off frequency) above an upper bound of the second frequency range 317 (e.g., frequency 322) to obtain a suppressed receive signal component 320. In some examples, low-pass filter 235-*d* may include an anti-aliasing filter 350. Low-pass filter 235-*d* may provide the filtered receive signal component 320 to ADC 240-*d*. In some examples, no preselect filters (e.g., no bandpass filters) for first frequency range 307 may be present in between antenna element 225-*d* and ADC 240-*d*. Having preselect filters in between antenna elements 225-*d* and ADC 240-*d* may be associated with correlated noise. Thus, removing these preselect filters may mitigate an amount of correlated noise, which may increase an efficacy of the digital filter 245-*d* and/or combining function 250-*a* in removing noise.

ADC 240-*d* may digitize the suppressed receive signal component 320 over the second frequency range to obtain a digitized receive signal component 325. A sampling frequency 324 of ADC 240-*d* may be at least four times higher than a highest frequency 322 of the first frequency range 307. After the digitizing, frequency range 329 may correspond to the second frequency range 317; frequency 327 may correspond to frequency 322 and may represent a largest value of the frequency range 329; and frequency 328 may correspond to the sampling frequency 324 and may represent a value at which the sampled frequency profile of suppressed receive signal component 320 begins to repeat. ADC 240-*d* may provide the digitized receive signal component 325 to digital filter 245-*d*.

Digital filter 245-*d* may be applied (e.g., by a controller) to digitized receive signal component 325 to obtain a filtered receive signal component 330. In some examples, digital filter 245-*d* may be an example of a matched filter. In some examples, digital filter 245-*d* may have a frequency response 331 corresponding to candidate messages 332. The digital filter 245-*d* may provide the filtered receive signal component 330 to combining function 250-*a*. In some examples, digital down-conversion may be performed (e.g., by a controller) on digitized receive signal component 325 prior to providing digitized receive signal component 325 to digital filter 245-*d*.

Combining function 250-*a* may be applied (e.g., by a controller) to filtered receive signal component 330 to obtain second signal 335. In some examples, combining function 250-*a* may include an averaging function 355. The second signal 335 may be decoded to receive the message.

FIG. 4 shows an example of a circuit flow diagram 400 that supports small-signal centric scalable, massive signal processing gain architecture in accordance with aspects of the present disclosure. In some examples, circuit flow diagram 200 may implement one or more aspects of satellite communication system 100 and/or circuit flow diagram 200. For instance, controller 420 may be an example of a controller 120 as described with reference to FIG. 1 and/or a controller 202 as described with reference to FIG. 2; antenna element 405-*a*, amplifier 410-*a*, and digital to analog converter (DAC) 415-*a* may be an example of one or more components included in RF chain 115-*a*; antenna element 405-*b*, amplifier 410-*b*, and DAC 415-*b* may be an example of one or more components included in RF chain 115-*b*; antenna element 405-*c*, amplifier 410-*c*, and DAC 415-*c* may be an example of one or more components included in RF chain 115-*c*; antenna elements 405-*a*, 405-*b*, and 405-*c* may each be an example of one or more of antenna element 225-*a*, 225-*b*, or 225-*c*; amplifiers 410-*a*, 410-*b*, and 410-*c* may each be an example of one or more of LNAs 230-*a*, 230-*b*, and 230-*c* as described herein; reconstruction filters 413-*a*, 413-*b*, and 413-*c* may each be an example of one or more of low-pass filters 235-*a*, 235-*b*, or 235-*c*; or any combination thereof. Additionally, or alternatively, antenna elements 405-*a*, 405-*b*, and 405-*c*; amplifiers 410-*a*, 410-*b*, and 410-*c*; reconstruction filters 413-*a*, 413-*b*, and 413-*c*; DACs 415-*a*, 415-*b*, and 415-*c*; and controller 420 may each be examples of components included in antenna system 110. Controller 420 may include a transmit beamforming matrix 425 and an encoder 430. Although three pathways including transmit RF chains 402-*a*, 402-*b*, and 402-*c* with antenna elements 225-*e*, 225-*f*, and 225-*g*, respectively, are depicted, it is to be understood that the techniques described herein may be generalized to M pathways, where M≥2 and where M may represent a number of receivers or transmitters used to receive or transmit a given signal by the array. In some examples, when the antenna elements preserve signal polarization and signal angle of arrival, the number of pathways may be expanded to 3*M, where the number 3 may correspond to three orthogonal axes X, Y, and Z that are needed to preserve the signal polarization and the angle of arrival.

Amplifier 410-*a* may be coupled with antenna element 405-*a* and reconstruction filter 413-*a*; amplifier 410-*b* may be coupled with antenna element 405-*b* and reconstruction filter 413-*b*; and amplifier 410-*c* may be coupled with antenna element 405-*c* and reconstruction filter 413-*c*. DACs 415-*a*, 415-*b*, and 415-*c* may be coupled with reconstruction filters 413-*a*, 413-*b*, and 413-*c*, respectively. Transmit beamforming matrix 425 may be coupled with DACs 415-*a*, 415-*b*, and 415-*c* and encoder 430.

Controller 420 may generate a message 432 and may encode the message in one or more transmit signals 427 using an encoder 430. The encoder 430 may provide the one or more transmit signals to transmit beamforming matrix 425. The controller 420 may apply the transmit beamforming matrix to the one or more transmit signals to obtain a set of digitized transmit signal components 422. A first of the set of digitized transmit signal components 422 may be provided to DAC 415-*a*, a second of the set of digitized transmit signal components 422 may be provided to DAC 415-*b*, and a third of digitized transmit signal components 422 may be provided to DAC 415-*c*.

DACs 415-*a*, 415-*b*, and 415-*c* may be configured to generate a set of transmit signal components 417 from the set of digitized transmit signal components 422. For instance, DAC 415-*a* may generate a first transmit signal component from the first of the set of digitized transmit signal components; DAC 415-*b* may generate a second transmit signal component from the second of the set of digitized transmit signal components; and DAC 415-*c* may generate a third transmit signal component from the third of the set of digitized transmit signal components. DACs 415-*a*, 415-*b*, and 415-*c* may provide the first, second, and third transmit signal components, respectively, to reconstruction filters 413-*a*, 413-*b*, and 413-*c*.

Reconstruction filters 413-*a*, 413-*b*, and 413-*c* may be configured to suppress (e.g., attenuate) a portion of each of the set of transmit signal components 417 above a cut-off frequency to obtain a set of suppressed transmit signal components 414. For instance, reconstruction filter 413-*a* may be configured to suppress (e.g., attenuate) the portion of the first transmit signal component above the cut-off frequency to obtain a first suppressed transmit signal component; reconstruction filter 413-*b* may be configured to suppress (e.g., attenuate) the portion of the second transmit signal component above the cut-off frequency to obtain a second suppressed transmit signal component; and reconstruction filter 413-*c* may be configured to suppress (e.g., attenuate) the portion of the third transmit signal component above the cut-off frequency to obtain a third suppressed transmit signal component. Reconstruction filters 413-*a*, 413-*b*, and 413-*c* may provide the set of suppressed transmit signal components 414 to amplifiers 410-*a*, 410-*b*, and 410-*c*.

Amplifiers 410-*a*, 410-*b*, and 410-*c* may be configured to amplify the set of suppressed transmit signal components 414 to obtain a set of amplified transmit signal components 412. For instance, amplifier 410-*a* may amplify the first transmit signal component; amplifier 410-*b* may amplify the second transmit signal component; and amplifier 410-*c* may amplify the third transmit signal component. Amplifiers 410-*a*, 410-*b*, and 410-*c* may provide the first, second, and third amplified transmit signal components, respectively, to antenna elements 405-*a*, 405-*b*, and 405-*c*.

Antenna elements 405-*a,* 405-*b,* and 405-*c* may transmit the first, second, and third amplified transmit signal components of the set of amplified transmit signal components 412 to a terminal (e.g., a terminal 105 as described herein). The terminal may receive the first, second, and third amplified transmit signal components and may construct a second signal from the first, second, and third amplified transmit signal components. The terminal may decode the second signal to receive the message generated by controller 420.

Figure 5:
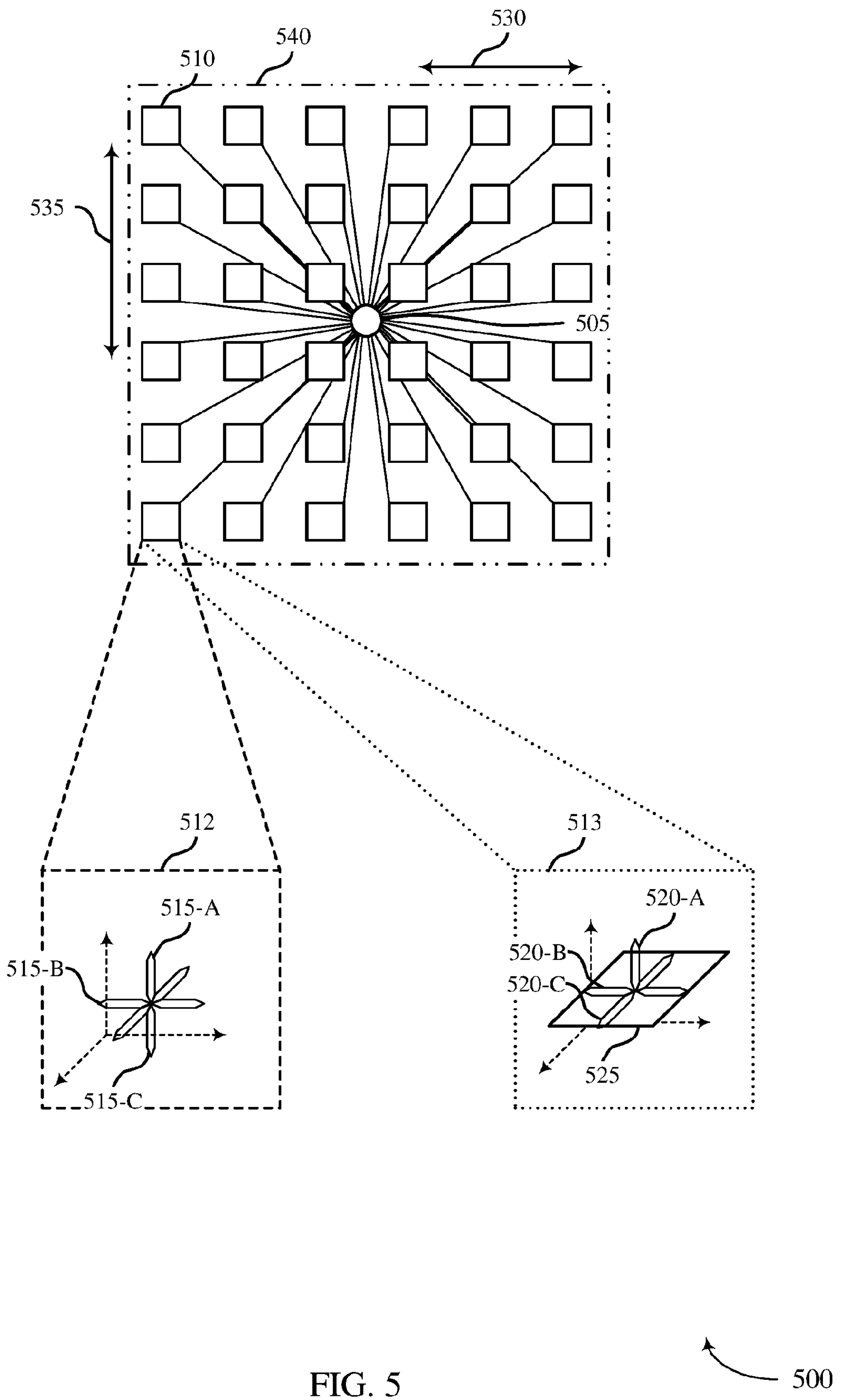
FIG. 5 shows an example of an antenna system that supports small-signal centric scalable, massive signal processing gain architecture in accordance with aspects of the present disclosure.

FIG. 5 shows an example of an antenna system 500 that supports small-signal centric scalable, massive signal processing gain architecture in accordance with aspects of the present disclosure. In some examples, antenna system 500 may implement one or more aspects of satellite communication system 100; circuit flow diagrams 200 and 400; and signal flow diagram 300. For instance, controller 505 may be an example of a controller 120 as described with reference to FIG. 1; a controller 202 as described with reference to FIG. 2; a controller 420 as described with reference to FIG. 4; or any combination thereof. Additionally, RF chain 510 may be an example of an RF chain 115-*a,* 115-*b,* or 115-*c* as described with reference to FIG. 1. Additionally, tripole 512 and half-tripole 513 may each be an example of or include any of antenna elements 225-*a* through 225-*m* and/or 405-*a* through 405-*c* as described herein. For instance, each of the three dipoles of tripole 512 may correspond to a separate antenna element (e.g., a first to antenna element 225-*a,* a second to antenna element 225-*b,* and a third to antenna element 225-*c*). Additionally, each of the two dipoles and one unipole antenna may correspond to a separate antenna element (e.g., the unipole to antenna element 225-*a,* a first dipole to antenna element 225-*b,* and a second dipole to antenna element 225-*c*).

Controller 505 may be coupled with each RF chain 510 of a set of RF chains arranged in a grid extending in a first direction 530 and a second direction 535. Each RF chain 510 may include a tripole 512 or a half-tripole 513. Each tripole 512 may include three poles 515-*a,* 515-*b,* and 515-*c.* Each of the poles 515-*a,* 515-*b,* and 515-*c* may be a dipole extending in orthogonal directions relative to each other. Each half-tripole 513 may include three poles 520-*a,* 520-*b,* and 520-*c* and a ground plane mirror 525. In some examples, pole 520-*a* may be a unipole and poles 520-*b* and 520-*c* may each be dipoles. In some examples, poles 520-*a,* 520-*b,* and 520-*c* may extend in orthogonal directions relative to each other. In some examples, the set of RF chains may be arranged in a grid 540 (e.g., a regular grid or a random grid) that extends in a first direction 530 and a second direction 535 perpendicular to the first direction 530. In some examples, the grid 540 may represent a large, sparse, nonharmonic random collection of antennas (LSNHRCA).

In some examples, angle of arrival (AoA) processing for each pole of the tripole 512 (e.g., each dipole) may be performed at the controller that performs digital filtering for signal components received from a terminal (e.g., a controller 202 as described with reference to FIG. 2). Additionally, or alternatively, AoA processing may be performed along the RF chain between the poles of the tripole 512 or half-tripole 513 and the controller that performs digital filtering (e.g., in the analog or the digital domain). In some examples, each pole of the tripole 512 (e.g., poles 515-*a,* 515-*b,* and 515-*c*) and/or half-tripole 513 (e.g., poles 520-*a,* 520-*b,* and 520-*c*) may correspond to a different RF chain.

Figure 6:
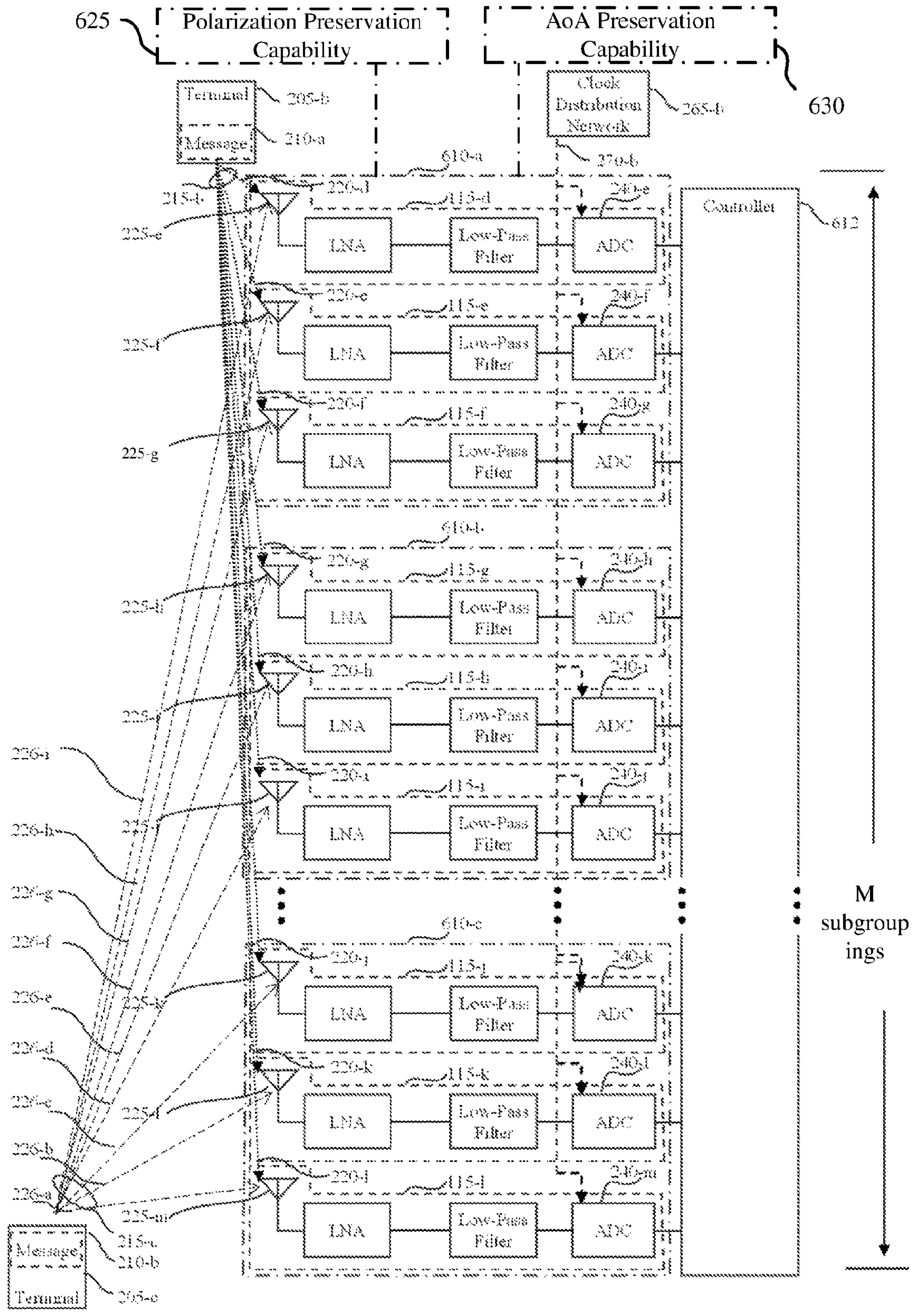
FIG. 6 shows an example of a circuit flow diagram that supports small-signal centric scalable, massive signal processing gain architecture in accordance with aspects of the present disclosure.

FIG. 6 shows an example of a circuit flow diagram 600 that supports small-signal centric scalable, massive signal processing gain architecture in accordance with aspects of the present disclosure. In some examples, circuit flow diagram may implement one or more aspects of satellite communication system 100; circuit flow diagrams 200 and 400; signal flow diagram 300; or antenna system 500. For instance, terminals 205-*b* and 205-*c* may each be an example of a terminal 105, a terminal 205, a terminal 205-*a,* or any combination thereof. Antenna elements 225-*e* through 225-*m* may each be an example of antenna elements 225-*a* through 225-*d,* antenna elements 405-*a* through 405-*c,* tripole poles 515-*a* through 515-*c,* half-tripole poles 520-*a* through 520-*c,* or any combination thereof. RF chains 115 (e.g., RF chains 115-*d,* 115-*e,* 115-*f,* 115-*g,* 115-*h,* 115-*i,* 115-*j,* 115-*k,* 115-*l*) may be examples of RF chains 115 of FIG. 1, 2, or 4. Controller 612 may be an example of controller 120, controller 202, controller 420, controller 505, or any combination thereof. In some examples, messages 210-*a* and 210-*b* may each be an example of a message 210; signals 215-*b* and 215-*c* may each be an example of a signal 215, and signal components 220-*d* through 220-*l* may each be an example of one of signals components 220-*a,* 220-*b,* and 220-*c.* In some examples, ADCs 240 (e.g., ADCs 240-*e,* 240-*f,* 240-*g,* 240-*h,* 240-*i,* 240-*j,* 240-*k,* 240-*l,* 240-*m*) may each be an example of one of ADCs 240-*a,* 240-*b,* 240-*c,* or 240-*d.* Clock distribution network 265-*b* may be an example of clock distribution network 265 of FIG. 2, and may generate common clock signal 270-*b.*

Antenna elements 225-*e* through 225-*m* may be coupled with ADCs 240-*e* through 240-*m,* respectively, via respective LNAs and low-pass filters. ADCs 240-*e* through 240-*m* may be coupled with controller 612.

In some examples, terminal 205-*b* may generate a message 210-*a* and may encode the message 210-*a* in a first signal 215-*b.* Terminal 205-*b* may transmit the first signal 215-*b* towards antenna elements 225-*e* through 225-*m.* Antenna elements 225-*e* through 225-*m* may be divided into multiple subgroups of RF chains. For instance, subgroup 610-*a* may include the three RF chains associated with antenna elements 225-*e,* 225-*f,* and 225-*g;* subgroup 610-*b* may include the three RF chains associated with antenna elements 225-*h,* 225-*i,* and 225-*j;* and subgroup 610-*c* may include the three RF chains associated with antenna elements 225-*k,* 225-*l,* and 225-*m.* In some examples, subgroups 610-*a,* 610-*b,* and 610-*c* may be configured to preserve signal polarization and signal angle of arrival for signals received at the antenna elements of each subgroup. For instance, subgroups 610-*a,* 610-*b,* and 610-*c* may have a polarization preservation capability 625 and an AoA preservation capability 630.

In some examples, antenna elements 225-*e,* 225-*h,* and 225-*k* may represent a pole of a tripole or a half-tripole extending along an X axis local to each tripole or half-tripole individually; antenna elements 225-*f,* 225-*i,* and 225-*l* may represent a pole of a tripole or a half-tripole extending along a Y axis local to each tripole or half-tripole individually that is orthogonal to its corresponding X axis; and antenna elements 225-*g,* 225-*j,* and 225-*m* may represent a pole of a tripole or a half-tripole extending along a Z axis local to each tripole or half-tripole individually that is orthogonal to its corresponding X and Y axes. In such examples, antenna elements 225-*e,* 225-*f,* and 225-*g* may receive the E-field of signal components 220-*d,* 220-*e,* and 220-*f* in their respective three orthogonal axes X, Y, and Z corresponding to the signal 215-*b* including its polarization and its angle of arrival into subgroup 610-*a;* antenna elements 225-*h,* 225-*i,* and 225-*j* may receive the E-field of signal components 220-*g,* 220-*h,* and 220-*i* in their respective three orthogonal axes X, Y, and Z corresponding to the signal 215-*b* including its polarization and its angle of arrival into subgroup 610-*b;* and antenna elements 225-*k*, 225-*l*, and 225-*m* may receive the E-field of signal components 220-*j*, 220-*k*, and 220-*l* in their respective three orthogonal axes X, Y, and Z corresponding to the signal 215-*b* including its polarization and its angle of arrival into subgroup 610-*c*.

In some examples, the X, Y, and Z axes of each tripole or half-tripole may be rigidly oriented with regards to each other tripole or half-tripole. For instance, the X, Y, and Z axes of each tripole or half-tripole may point along a same direction as the respective X, Y, and Z axis of each other tripole or half-tripole. Such tripoles or half-tripoles may have translation differences between reference systems. In other examples, the X, Y, and Z axes of each tripole or half-tripole may be randomly oriented with regards to each other tripole or half-tripole. For instance, the X, Y, and Z axis of a first tripole or half-tripole may point along a direction independent of (e.g., different from) that of the X, Y, and Z axis of a second tripole or half-tripole. In such examples, the relative orientations of each tripole or half-tripole along with relative radial distances to a spacecraft origin may be calibrated, and the calibration may be used to process signals (e.g., the signal components) to align for signal digital filtering and spatial averaging.

In some examples, terminal 205-*c* may generate a message 210-*b* and may encode the message 210-*b* in a second signal 215-*c*. Terminal 205-*c* may transmit the second signal 215-*c* towards antenna elements 225-*e* through 225-*m*. In such examples, antenna elements 225-*e*, 225-*f*, and 225-*g* may receive the E-field of signal components 226-*i*, 226-*h*, and 226-*g* in their respective locally oriented three orthogonal axes X, Y, and Z corresponding to the signal 215-*c* including its polarization and its angle of arrival into subgroup 610-*a*; antenna elements 225-*h*, 225-*i*, and 225-*j* may receive the E-field of signal components 226-*f*, 226-*e*, and 226-*d* in their respective locally oriented three orthogonal axes X, Y, and Z corresponding to the signal 215-*c* including its polarization and its angle of arrival into subgroup 610-*b*; and antenna elements 225-*k*, 225-*l*, and 225-*m* may receive the E-field of signal components 226-*c*, 226-*b*, and 226-*a* in their respective locally oriented three orthogonal axes X, Y, and Z corresponding to the signal 215-*c* including its polarization and its angle of arrival into subgroup 610-*c*.

As in the manner of FIG. 2 and FIG. 3, subgroups 610-*a*, 610-*b*, and 610-*c* may send digitized information from associated ADCs 240-*e* through 240-*m* to controller 612. ADC 240-*e* through 240-*g* outputs may provide complete signal E-Field information including polarization and angle of arrival associated with subgroup 610-*a*; ADC 240-*h* through 240-*j* outputs may provide complete signal E-Field information including polarization and angle of arrival associated with subgroup 610-*b*; and ADC 240-*k* through 240-*m* outputs may provide complete signal E-Field information including polarization and angle of arrival associated with subgroup 610-*c*.

From the AoA and polarization information, controller 612 may demultiplex and decode parallel message streams from two independent transmissions from terminals 205-*b* and 205-*c* (e.g., signals 215-*b* and 215-*c*) when these transmissions have either different angles of arrival into each of the subgroups 610-*a* through 610-*c* and different polarizations, different angles of arrival into each of the subgroups 610-*a* through 610-*c* and the same polarization, or the same angles of arrival into each of the subgroups 610-*a* through 610-*c* and different polarizations.

Figure 7:
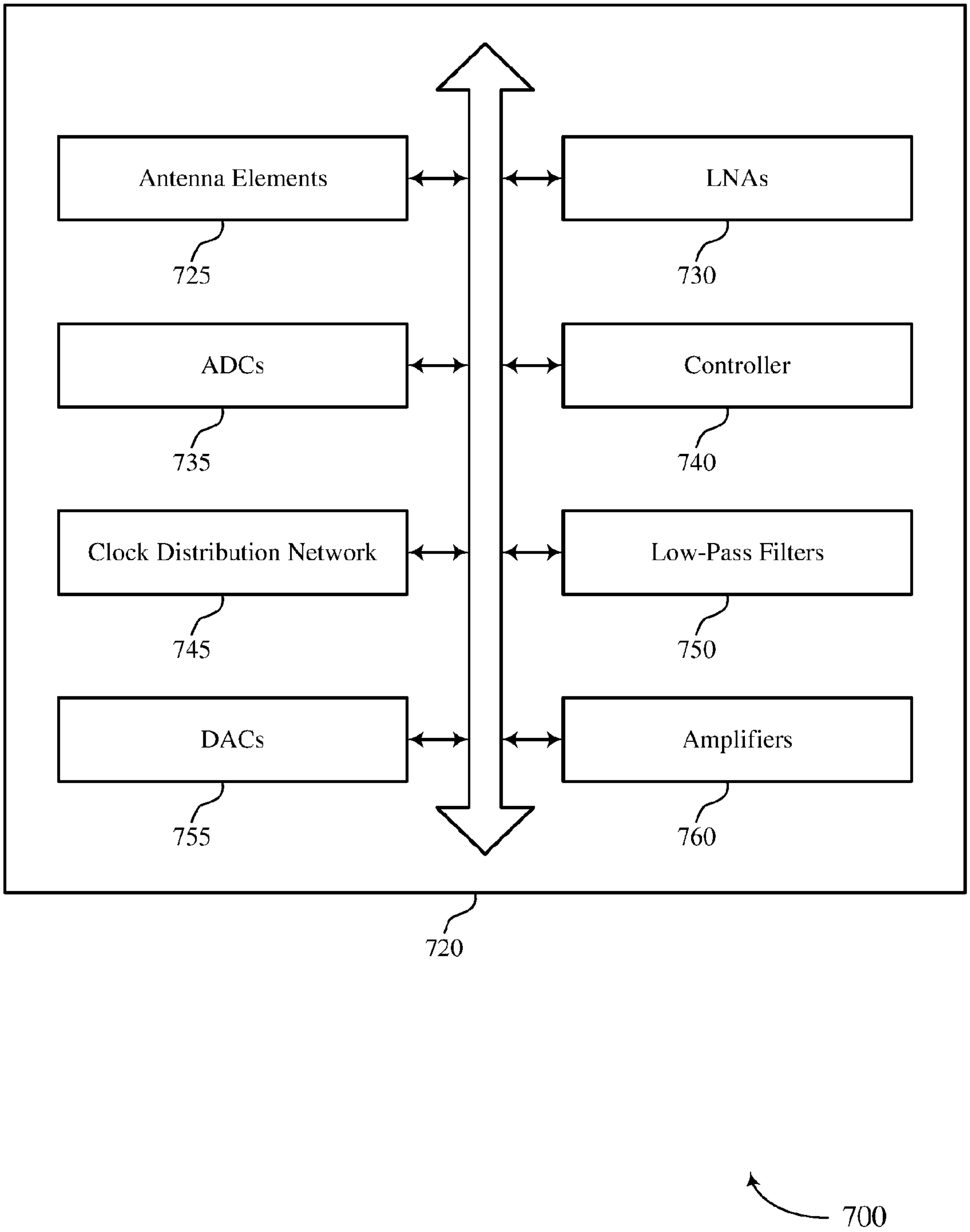
FIG. 7 shows a block diagram of a beam manager that supports small-signal centric scalable, massive signal processing gain architecture in accordance with aspects of the present disclosure.

FIG. 7 shows a block diagram 700 of an antenna system 720 that supports small-signal centric scalable, massive signal processing gain architecture in accordance with aspects of the present disclosure. The antenna system 720 may be an example of aspects of an antenna system as described with reference to FIGS. 1 through 6. The antenna system 720, or various components thereof, may be an example of means for performing various aspects of small-signal centric scalable, massive signal processing gain architecture as described herein. For example, the antenna system 720 may include an antenna elements 725, a LNAs 730, an ADCs 735, a controller 740, a clock distribution network 745, a low-pass filters 750, a DACs 755, an amplifiers 760, or any combination thereof. Each of these components, or components of subcomponents thereof (e.g., one or more processors, one or more memories), may communicate, directly or indirectly, with one another (e.g., via one or more buses).

The antenna elements 725 may be configured as or otherwise support a means for receiving, at a plurality of antenna elements, a plurality of receive signal components associated with a first signal transmitted from a terminal in a first frequency range, wherein the first signal comprises a receive message. The LNAs 730 may be configured as or otherwise support a means for amplifying, at a plurality of low noise amplifiers (LNAs), a second frequency range of the plurality of receive signal components to obtain a plurality of amplified receive signal components, wherein each LNA of the plurality of LNAs is coupled with a respective antenna element of the plurality of antenna elements, and wherein the second frequency range comprises the first frequency range and has a bandwidth that is at least a multiple of a bandwidth of the first frequency range. The ADCs 735 may be configured as or otherwise support a means for digitizing, at a plurality of analog to digital converters (ADCs) coupled with the plurality of LNAs, the plurality of amplified receive signal components over the second frequency range to obtain a plurality of digitized receive signal components, and wherein a sampling frequency of each of the plurality of ADCs is at least a multiple of four of that of a highest frequency of the second frequency range. The controller 740 may be configured as or otherwise support a means for obtaining, at a controller coupled with the plurality of ADCs, the plurality of digitized receive signal components from the plurality of ADCs. In some examples, the controller 740 may be configured as or otherwise support a means for applying a digital filter to each of the plurality of digitized receive signal components to obtain a plurality of filtered receive signal components. In some examples, the controller 740 may be configured as or otherwise support a means for applying a combining function to the plurality of filtered receive signal components to obtain a second signal. In some examples, the controller 740 may be configured as or otherwise support a means for decoding the receive message from the second signal.

In some examples, each amplified receive signal component comprises a signal portion and a noise portion. In some examples, a power of the signal portion is lower than a power of the noise portion.

In some examples, the clock distribution network 745 may be configured as or otherwise support a means for distributing, using a clock distribution network coupled with the plurality of ADCs, a common clock signal to the plurality of ADCs for digitizing the plurality of amplified receive signal components.

In some examples, the low-pass filters 750 may be configured as or otherwise support a means for attenuating, at a plurality of low-pass filters, a portion of the plurality of amplified receive signal components above an upper bound of the second frequency range before the plurality of ADCs digitize the plurality of amplified receive signal components, wherein each low-pass filter of the plurality of low-pass filters is coupled with a respective LNA of the plurality of LNAs and a respective ADC of the plurality of ADCs.

In some examples, each LNA of the plurality of LNAs is coupled with the respective antenna element of the plurality of antenna elements. In some examples, each low-pass filter of the plurality of low-pass filters is directly coupled with the respective LNA of the plurality of LNAs and the respective ADC of the plurality of ADCs.

In some examples, each low-pass filter of the plurality of low-pass filters comprises an anti-aliasing filter.

In some examples, the first frequency range comprises a same range of frequencies as that spanned by a representation of the message in the respective receive signal component received at the respective antenna element of the plurality of antenna elements.

In some examples, the plurality of receive signal components are directly sampled with no analog down-conversion performed on the plurality of receive signal components between being received at the plurality of antenna elements and being digitized at the plurality of ADCs.

In some examples, the digital filter has a frequency response corresponding to candidate messages. In some examples, decoding the receive message from the second signal is based at least in part on the digital filter having the frequency response corresponding to candidate messages.

In some examples, the combining function comprises an averaging function.

In some examples, the sampling frequency at least sixteen times higher than the highest frequency of the second frequency range.

In some examples, the bandwidth of the second frequency range is at least sixteen times greater than the bandwidth of the first frequency range.

In some examples, the controller 740 may be configured as or otherwise support a means for encoding, at the controller coupled with a plurality of digital to analog converters (DACs), one or more transmit messages to obtain one or more transmit signals (e.g., downlink signals). In some examples, the controller 740 may be configured as or otherwise support a means for applying, at the controller, a transmit beamforming matrix to the one or more transmit signals to obtain a plurality of digitized transmit signal components. In some examples, the DACs 755 may be configured as or otherwise support a means for generating, at the plurality of DACs, a plurality of transmit signal components from the plurality of digitized transmit signal components. In some examples, the amplifiers 760 may be configured as or otherwise support a means for amplifying, at a plurality of amplifiers coupled with the plurality of DACs and the plurality of antenna elements, the plurality of transmit signal components. In some examples, the amplifiers 760 may be configured as or otherwise support a means for providing, from the plurality of amplifiers to the plurality of antenna elements, the plurality of amplified transmit signal components.

In some examples, each subgroup of antenna elements of the plurality of antenna elements comprises a capability to preserve signal polarization and a capability to preserve signal angle of arrival and the controller being configured to apply the digital filter may be based on the capability to preserve signal polarization and the capability to preserve signal angle of arrival.

In some examples, each subgroup of antenna elements of the plurality of antenna elements comprises a tripole of a plurality of tripoles or a half-tripole of a plurality of half-tripoles and the plurality of tripoles or the plurality of half-tripoles are arranged in a grid (e.g., a regular grid, a randomized grid) that extends in a first direction and a second direction perpendicular to the first direction.

Figure 8:
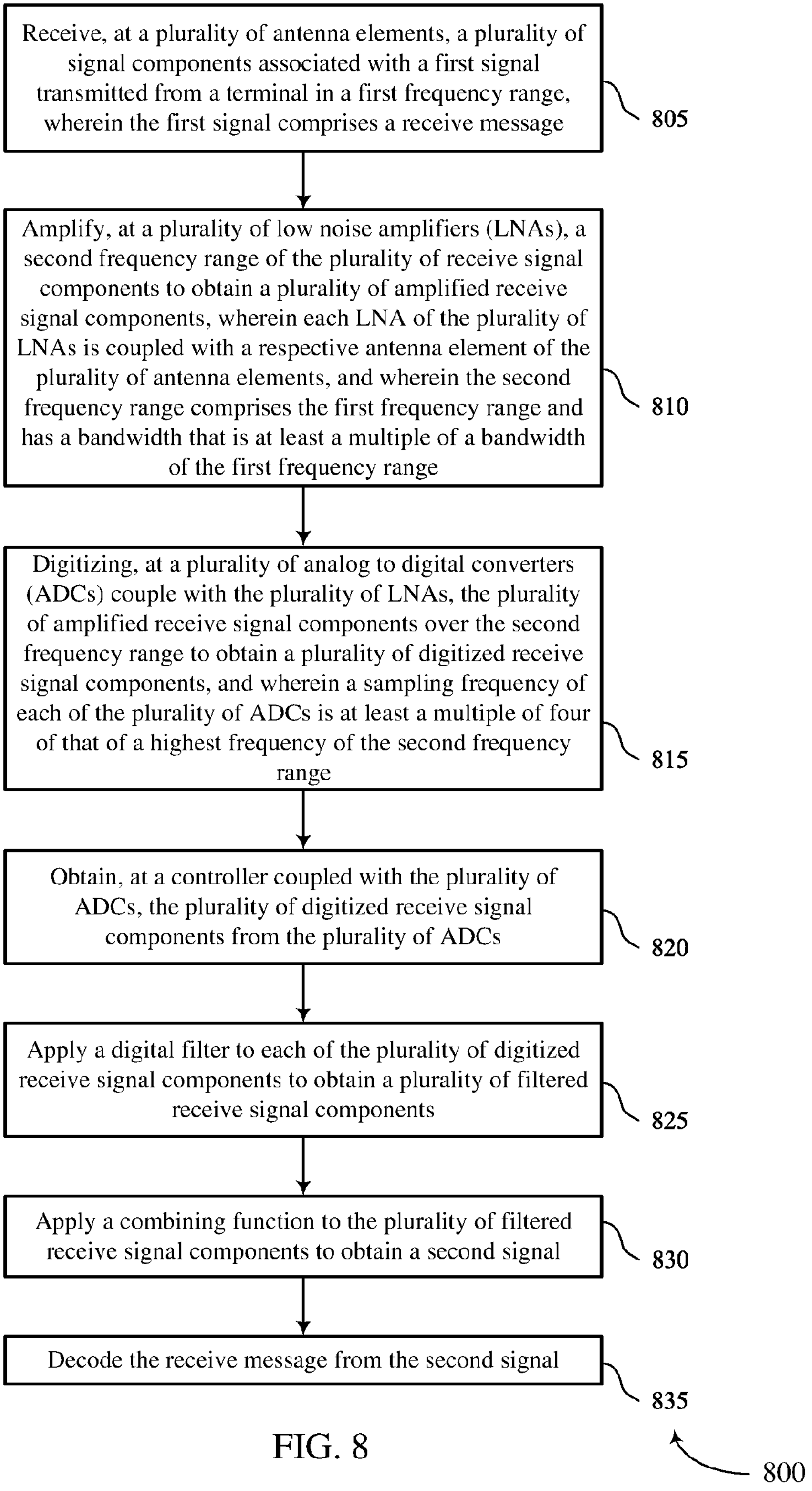
FIG. 8 shows a flowchart illustrating methods that support small-signal centric scalable, massive signal processing gain architecture in accordance with aspects of the present disclosure.

FIG. 8 shows a flowchart illustrating a method 800 that supports small-signal centric scalable, massive signal processing gain architecture in accordance with aspects of the present disclosure. The operations of the method 800 may be implemented by an antenna system or its components as described herein. For example, the operations of the method 800 may be performed by an antenna system as described with reference to FIGS. 1 through 7. In some examples, an antenna system may execute a set of instructions to control the functional elements of the antenna system to perform the described functions. Additionally, or alternatively, the antenna system may perform aspects of the described functions using special-purpose hardware.

At 805, the method may include receiving, at a plurality of antenna elements, a plurality of receive signal components associated with a first signal transmitted from a terminal in a first frequency range, wherein the first signal comprises a receive message. The operations of block 805 may be performed in accordance with examples as disclosed herein. In some examples, aspects of the operations of 805 may be performed by an antenna elements 725 as described with reference to FIG. 7.

At 810, the method may include amplifying, at a plurality of low noise amplifiers (LNAs), a second frequency range of the plurality of receive signal components to obtain a plurality of amplified receive signal components, wherein each LNA of the plurality of LNAs is coupled with a respective antenna element of the plurality of antenna elements, and wherein the second frequency range comprises the first frequency range and has a bandwidth that is at least a multiple of a bandwidth of the first frequency range. The operations of block 810 may be performed in accordance with examples as disclosed herein. In some examples, aspects of the operations of 810 may be performed by a LNAs 730 as described with reference to FIG. 7.

At 815, the method may include digitizing, at a plurality of analog to digital converters (ADCs) coupled with the plurality of LNAs, the plurality of amplified receive signal components over the second frequency range to obtain a plurality of digitized receive signal components, and wherein a sampling frequency of each of the plurality of ADCs is at least a multiple of four of that of a highest frequency of the second frequency range. The operations of block 815 may be performed in accordance with examples as disclosed herein. In some examples, aspects of the operations of 815 may be performed by an ADCs 735 as described with reference to FIG. 7.

At 820, the method may include obtaining, at a controller coupled with the plurality of ADCs, the plurality of digitized receive signal components from the plurality of ADCs. The operations of block 820 may be performed in accordance with examples as disclosed herein. In some examples, aspects of the operations of 820 may be performed by a controller 740 as described with reference to FIG. 7.

At 825, the method may include applying a digital filter to each of the plurality of digitized receive signal components to obtain a plurality of filtered receive signal components. The operations of block 825 may be performed in accordance with examples as disclosed herein. In some examples, aspects of the operations of 825 may be performed by a controller 740 as described with reference to FIG. 7.

At 830, the method may include applying a combining function to the plurality of filtered receive signal components to obtain a second signal. The operations of block 830 may be performed in accordance with examples as disclosed herein. In some examples, aspects of the operations of 830 may be performed by a controller 740 as described with reference to FIG. 7.

At 835, the method may include decoding the receive message from the second signal. The operations of block 835 may be performed in accordance with examples as disclosed herein. In some examples, aspects of the operations of 835 may be performed by a controller 740 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a plurality of antenna elements, a plurality of receive signal components associated with a first signal transmitted from a terminal in a first frequency range, wherein the first signal comprises a receive message; amplifying, at a plurality of low noise amplifiers (LNAs), a second frequency range of the plurality of receive signal components to obtain a plurality of amplified receive signal components, wherein each LNA of the plurality of LNAs is coupled with a respective antenna element of the plurality of antenna elements, and wherein the second frequency range comprises the first frequency range and has a bandwidth that is at least a multiple of a bandwidth of the first frequency range; digitizing, at a plurality of analog to digital converters (ADCs) coupled with the plurality of LNAs, the plurality of amplified receive signal components over the second frequency range to obtain a plurality of digitized receive signal components, and wherein a sampling frequency of each of the plurality of ADCs is at least a multiple of four of that of a highest frequency of the second frequency range; obtaining, at a controller coupled with the plurality of ADCs, the plurality of digitized receive signal components from the plurality of ADCs; applying a digital filter to each of the plurality of digitized receive signal components to obtain a plurality of filtered receive signal components; applying a combining function to the plurality of filtered receive signal components to obtain a second signal; and decoding the receive message from the second signal.

Aspect 2: The method, apparatus, or non-transitory computer-readable medium of aspect 1, where each amplified receive signal component comprises a signal portion and a noise portion and a power of the signal portion is lower than a power of the noise portion.

Aspect 3: The method, apparatus, or non-transitory computer-readable medium of any of aspects 1 through 2, further including operations, features, circuitry, logic, means, or instructions, or any combination thereof for distributing, using a clock distribution network coupled with the plurality of ADCs, a common clock signal to the plurality of ADCs for digitizing the plurality of amplified receive signal components.

Aspect 4: The method, apparatus, or non-transitory computer-readable medium of any of aspects 1 through 3, further including operations, features, circuitry, logic, means, or instructions, or any combination thereof for attenuating, at a plurality of low-pass filters, a portion of the plurality of amplified receive signal components above an upper bound of the second frequency range before the plurality of ADCs digitize the plurality of amplified receive signal components, wherein each low-pass filter of the plurality of low-pass filters is coupled with a respective LNA of the plurality of LNAs and a respective ADC of the plurality of ADCs.

Aspect 5: The method, apparatus, or non-transitory computer-readable medium of aspect 4, where each LNA of the plurality of LNAs is coupled with the respective antenna element of the plurality of antenna elements and each low-pass filter of the plurality of low-pass filters is directly coupled with the respective LNA of the plurality of LNAs and the respective ADC of the plurality of ADCs.

Aspect 6: The method, apparatus, or non-transitory computer-readable medium of any of aspects 4 through 5, where each low-pass filter of the plurality of low-pass filters comprises an anti-aliasing filter.

Aspect 7: The method, apparatus, or non-transitory computer-readable medium of any of aspects 1 through 6, where the first frequency range comprises a same range of frequencies as that spanned by a representation of the message in the respective receive signal component received at the respective antenna element of the plurality of antenna elements.

Aspect 8: The method, apparatus, or non-transitory computer-readable medium of any of aspects 1 through 7, where the plurality of receive signal components are directly sampled with no analog down-conversion performed on the plurality of receive signal components between being received at the plurality of antenna elements and being digitized at the plurality of ADCs.

Aspect 9: The method, apparatus, or non-transitory computer-readable medium of any of aspects 1 through 8, where the digital filter has a frequency response corresponding to candidate messages and decoding the receive message from the second signal is based at least in part on the digital filter having the frequency response corresponding to candidate messages.

Aspect 10: The method, apparatus, or non-transitory computer-readable medium of any of aspects 1 through 9, where the combining function comprises an averaging function.

Aspect 11: The method, apparatus, or non-transitory computer-readable medium of any of aspects 1 through 10, where the sampling frequency at least sixteen times higher than the highest frequency of the second frequency range.

Aspect 12: The method, apparatus, or non-transitory computer-readable medium of any of aspects 1 through 11, where the bandwidth of the second frequency range is at least sixteen times greater than the bandwidth of the first frequency range.

Aspect 13: The method, apparatus, or non-transitory computer-readable medium of any of aspects 1 through 12, further including operations, features, circuitry, logic, means, or instructions, or any combination thereof for encoding, at the controller coupled with a plurality of digital to analog converters (DACs), one or more transmit messages to obtain one or more transmit signals; applying, at the controller, a transmit beamforming matrix to the one or more transmit signals to obtain a plurality of digitized transmit signal components; generating, at the plurality of DACs, a plurality of transmit signal components from the plurality of digitized transmit signal components; amplifying, at a plurality of amplifiers coupled with the plurality of DACs and the plurality of antenna elements, the plurality of transmit signal components; and providing, from the plurality of amplifiers to the plurality of antenna elements, the plurality of amplified transmit signal components.

Aspect 14: The method, apparatus, or non-transitory computer-readable medium of any of aspects 1 through 13, where each subgroup of antenna elements of the plurality of antenna elements comprises a capability to preserve signal polarization and a capability to preserve signal angle of arrival and the controller being configured to apply the digital filter is based at least in part on the capability to preserve signal polarization and the capability to preserve signal angle of arrival.

Aspect 15: The method, apparatus, or non-transitory computer-readable medium of any of aspects 1 through 14, where each subgroup of antenna elements of the plurality of antenna elements comprises a tripole of a plurality of tripoles or a half-tripole of a plurality of half-tripoles and the plurality of tripoles or the plurality of half-tripoles are arranged in a grid that extends in a first direction and a second direction perpendicular to the first direction.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer readable media includes both non transitory computer storage media and communication media including any medium that facilitates transfer of a computer program from one place to another. A non-transitory storage medium may be any available medium that can be accessed by a general purpose or special purpose computer. By way of example, and not limitation, non-transitory computer readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general purpose or special purpose computer, or a general purpose or special purpose processor. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu ray disc where disks usually reproduce data magnetically, while discs reproduce data optically with lasers. Combinations of the above are also included within the scope of computer readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

a plurality of antenna elements configured to receive a quantity M of receive signal components associated with a first signal transmitted from a terminal in a first frequency range, wherein the first signal comprises a receive message;

a plurality of low noise amplifiers (LNAs) configured to amplify a second frequency range of the quantity M of receive signal components to obtain a quantity M of amplified receive signal components, wherein each LNA of the plurality of LNAs is coupled with a respective antenna element of the plurality of antenna elements, and wherein the second frequency range comprises the first frequency range and has a bandwidth that is at least two times greater than a bandwidth of the first frequency range;

a plurality of analog to digital converters (ADCs) coupled with the plurality of LNAs, wherein the plurality of ADCs are configured to digitize the quantity M of amplified receive signal components over the second frequency range to obtain a quantity M of digitized receive signal components, and wherein a sampling frequency of each of the plurality of ADCs is at least four times higher than a highest frequency of the second frequency range; and a controller coupled with the plurality of ADCs, the controller configured to:

obtain the quantity M of digitized receive signal components from the plurality of ADCs;

apply a digital filter to each of the quantity M of digitized receive signal components to obtain a quantity M of filtered receive signal components;

apply a combining function to the quantity M of filtered receive signal components to obtain a second signal, wherein the quantity M represents a quantity of independent pathways for receiving the first signal; and decode the receive message from the second signal.

2. The apparatus of claim 1, wherein:

each receive signal component comprises a signal portion and a noise portion, and a power of the signal portion is lower than a power of the noise portion.

3. The apparatus of claim 1, further comprising:

a clock distribution network coupled with the plurality of ADCs that distributes a common clock signal to the plurality of ADCs for digitizing the quantity M of amplified receive signal components.

4. The apparatus of claim 1, further comprising:

a plurality of low-pass filters configured to attenuate a portion of the quantity M of amplified receive signal components above an upper bound of the second frequency range before the plurality of ADCs digitize the quantity M of amplified receive signal components, wherein each low-pass filter of the plurality of low-pass filters is coupled with a respective LNA of the plurality of LNAs and a respective ADC of the plurality of ADCs.

5. The apparatus of claim 4, wherein:

each LNA of the plurality of LNAs is coupled with the respective antenna element of the plurality of antenna elements, and each low-pass filter of the plurality of low-pass filters is directly coupled with the respective LNA of the plurality of LNAs and the respective ADC of the plurality of ADCs.

6. The apparatus of claim 4, wherein each low-pass filter of the plurality of low-pass filters comprises an anti-aliasing filter.

7. The apparatus of claim 1, wherein the first frequency range comprises a same range of frequencies as that spanned by a representation of the receive message in the respective receive signal component received at the respective antenna element of the plurality of antenna elements.

8. The apparatus of claim 1, wherein the quantity M of receive signal components are directly sampled with no analog down-conversion performed on the quantity M of receive signal components between being received at the plurality of antenna elements and being digitized at the plurality of ADCs.

9. The apparatus of claim 1, wherein:

the digital filter has a frequency response corresponding to candidate messages, and decoding the receive message from the second signal is based at least in part on the digital filter having the frequency response corresponding to candidate messages.

10. The apparatus of claim 1, wherein the combining function comprises an averaging function.

11. The apparatus of claim 1, wherein the sampling frequency is at least sixteen times higher than the highest frequency of the second frequency range.

12. The apparatus of claim 1, wherein the bandwidth of the second frequency range is at least sixteen times greater than the bandwidth of the first frequency range.

13. The apparatus of claim 1, further comprising:

a plurality of digital to analog converters (DACs) configured to generate a plurality of transmit signal components from a plurality of digitized transmit signal components; and a plurality of amplifiers coupled with the plurality of DACs and the plurality of antenna elements and configured to amplify the plurality of transmit signal components and provide the plurality of amplified transmit signal components to the plurality of antenna elements for transmission, wherein the controller is coupled with the plurality of DACs and further configured to:

encode one or more transmit messages to obtain one or more transmit signals; and apply a transmit beamforming matrix to the one or more transmit signals to obtain the plurality of digitized transmit signal components.

14. The apparatus of claim 1, wherein:

each subgroup of antenna elements of the plurality of antenna elements comprises a capability to preserve signal polarization and a capability to preserve signal angle of arrival, and the controller being configured to apply the digital filter is based at least in part on the capability to preserve signal polarization and the capability to preserve signal angle of arrival.

15. The apparatus of claim 1, wherein:

each subgroup of antenna elements of the plurality of antenna elements comprises a tripole of a plurality of tripoles or a half-tripole of a plurality of half-tripoles, and the plurality of tripoles or the plurality of half-tripoles are arranged in a grid that extends in a first direction and a second direction perpendicular to the first direction.

* * * * *